(12) United States Patent
Nishinohara

(10) Patent No.: US 11,665,294 B2
(45) Date of Patent: May 30, 2023

(54) IMAGE READING APPARATUS AND IMAGE FORMING APPARATUS

(71) Applicant: CANON KABUSHIKI KAISHA, Tokyo (JP)

(72) Inventor: Takayuki Nishinohara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/832,916

(22) Filed: Jun. 6, 2022

(65) Prior Publication Data

US 2022/0407971 A1    Dec. 22, 2022

(30) Foreign Application Priority Data

Jun. 18, 2021    (JP) .............................. JP2021-101995

(51) Int. Cl.
*H04N 1/00* (2006.01)
*B65H 5/06* (2006.01)
*H04N 1/04* (2006.01)

(52) U.S. Cl.
CPC ......... *H04N 1/00602* (2013.01); *B65H 5/062* (2013.01); *H04N 1/00615* (2013.01); *H04N 1/0464* (2013.01); *B65H 2403/20* (2013.01)

(58) Field of Classification Search
CPC ................ B65H 2403/20; B65H 5/062; H04N 1/00602; H04N 1/00615; H04N 1/0464
USPC ......................................................... 358/498
See application file for complete search history.

(56) References Cited

U.S. PATENT DOCUMENTS

| 4,725,053 | A  | * | 2/1988  | Bastow ................ G03G 15/602<br>271/229 |
| 5,029,839 | A  | * | 7/1991  | Kajiwara ............. B65H 3/5269<br>271/124 |
| 6,135,441 | A  | * | 10/2000 | Belec ..................... B65H 3/045<br>271/35 |
| 10,392,211 | B2 | * | 8/2019  | Hishinuma ............ B65H 5/062 |
| 10,931,841 | B2 | * | 2/2021  | Fukushima ......... H04N 1/00649 |
| 2005/0157354 | A1 | * | 7/2005  | Ishida ................ H04N 1/00588<br>358/487 |
| 2014/0092448 | A1 | * | 4/2014  | Tsai ....................... H04N 1/121<br>358/498 |
| 2017/0180586 | A1 | * | 6/2017  | Ochiai .................... G10K 11/16 |

(Continued)

FOREIGN PATENT DOCUMENTS

| JP | 2000-026003 A | 1/2000 |
| JP | 2011-086988 A | 4/2011 |

*Primary Examiner* — Negussie Worku
(74) *Attorney, Agent, or Firm* — Venable LLP

(57) ABSTRACT

An image reading apparatus includes a supporting portion, a feeding portion, a curved conveyance path, a conveyance unit, an image reading unit, a driving source, an output pulley, an input pulley, a first pulley, a second pulley, a driving belt, and a transmission belt. The image reading unit is configured to read an image on a first surface at a location between the first driving roller and the second driving roller in a sheet conveyance direction. The output pulley is fixed to an output shaft of the driving source. The input pulley is fixed to the second driving roller. The first pulley is fixed to the first driving roller. The second pulley is fixed to the second driving roller. The driving belt is wound around the output pulley and the input pulley. The transmission belt is wound around the first pulley and the second pulley.

6 Claims, 16 Drawing Sheets

(56) References Cited

U.S. PATENT DOCUMENTS

2017/0183185 A1* 6/2017 Ichikawa .............. B65H 9/166
2017/0341886 A1* 11/2017 Hishinuma ........ G03B 27/6264
2020/0007704 A1* 1/2020 Fukushima ........ H04N 1/00649
2021/0188578 A1* 6/2021 Takagi .................... B65H 5/06

* cited by examiner

IMAGE READING APPARATUS AND IMAGE FORMING APPARATUS

BACKGROUND OF THE INVENTION

Field of the Invention

The present disclosure relates to an image reading apparatus that conveys a sheet and that reads an image from the sheet and to an image forming apparatus.

Description of the Related Art

An example of a copier, a facsimile machine, a multifunction peripheral, etc., is an image reading apparatus including an automatic document feeder (ADF) that conveys a sheet (document) to an image reading unit. The image reading apparatus carries out image reading of a sheet through a method by which a sheet is conveyed and an image is read therefrom (which is a process called feeding-reading). Such an image reading apparatus is provided with a plurality of conveyance roller pairs. A change in the conveyance speed of a sheet conveyed by these conveyance roller pairs raises a concern that a reading failure, such as a partial magnification ratio change and a color shift, may occur at a read image.

The image reading apparatus, in some cases, reads an image from a sheet, such as a business card and a postal card, that is smaller and harder than an ordinary sheet whose size ranges, for example, from A5 to A3. Such a small and hard sheet creates a large frictional resistance when coming in contact with a guide, particularly, on a part where a conveyance path is curved. Although the apparatus is provided with the plurality of conveyance roller pairs, such a small and hard sheet is conveyed by a single conveyance roller pair at a certain point of time. When the sheet being conveyed by two conveyance roller pairs passes through one conveyance roller pair on the upstream side to let the trailing edge of the sheet come out of the conveyance roller pair, the sheet is now conveyed by the other conveyance roller pair on the downstream side, that is, a single conveyance roller pair. At this time, a conveyance load resulting from a frictional resistance is applied to the single conveyance roller pair, increasing the conveyance load at the conveyance roller pair, thus leading to a change in the conveyance speed of the conveyance roller pair. This raises a concern that a reading failure may occur.

To deal with this problem, an apparatus has been proposed, which reads an image from a small and hard sheet and then conveys the sheet through a switched conveyance path so that the sheet travels through a path different from a curved conveyance path (see Japanese Patent Laid-Open No. 2000-26003). Another apparatus has also been proposed, in which a straight conveyance path from a reading position for reading an image from a front surface of a sheet to a reading position for reading an image from a back surface of the same is made longer than the length of a small and hard document (see Japanese Patent Laid-Open No. 2011-86988).

However, the apparatus that switches the conveyance path, the apparatus being disclosed in Japanese Patent Laid-Open No. 2000-26003, requires another path and needs a configuration for conveyance path switching, thus inviting a problem that the complicated structure of the apparatus leads to a cost increase. The apparatus in which the straight conveyance path is formed, the apparatus being disclosed in Japanese Patent Laid-Open No. 2011-86988, on the other hand, has difficulty in arranging conveyance paths in a compact manner. In particular, when equipped with two image reading units for reading images from the front surface and back surface of the sheet, the apparatus needs two straight conveyance paths, which invites a problem of an increase in the size of the apparatus.

One possible solution to such problems is to connect a drive motor to each of driving rollers making up conveyance roller pairs and independently drive and control each driving roller, thereby enabling feedback control by which a constant rotational speed is maintained to stabilize a roller speed. This method, however, requires that a plurality of drive motors be provided respectively for a plurality of driving rollers, which makes control of the rollers more complicated, thus leading to a problem of an increase in the cost and size of the apparatus.

SUMMARY OF THE INVENTION

The present disclosure provides an image reading apparatus and an image forming apparatus that are configured to reduce image reading failures without inviting an increase in the cost or size of the apparatuses.

According to a first aspect of the present invention, an image reading apparatus includes a supporting portion configured to support a sheet, a feeding portion configured to feed the sheet supported on the supporting portion, a curved conveyance path in which the sheet fed by the feeding portion is conveyed, a conveyance unit including a first driving roller configured to convey the sheet and a second driving roller configured to convey the sheet next to the first driving roller, the conveyance unit being configured to convey the sheet fed by the feeding portion in the conveyance path, an image reading unit configured to read an image on a first surface at a location between the first driving roller and the second driving roller in a sheet conveyance direction, the first surface being an upper surface of the sheet in a state of being supported on the supporting portion, a driving source configured to output a driving force that drives the first driving roller and the second driving roller, an output pulley fixed to an output shaft of the driving source, an input pulley fixed to the second driving roller, a first pulley fixed to the first driving roller, a second pulley fixed to the second driving roller, a driving belt wound around the output pulley and the input pulley; and a transmission belt wound around the first pulley and the second pulley.

According to a second aspect of the present invention, an image forming apparatus includes a supporting portion configured to support a sheet, a feeding portion configured to feed the sheet supported on the supporting portion, a curved conveyance path in which the sheet fed by the feeding portion is conveyed, a conveyance unit including a first driving roller configured to convey the sheet and a second driving roller configured to convey the sheet next to the first driving roller, the conveyance unit being configured to convey the sheet fed by the feeding portion in the conveyance path, an image reading unit configured to read an image on a first surface at a location between the first driving roller and the second driving roller in a sheet conveyance direction, the first surface being an upper surface of the sheet in a state of being supported on the supporting portion, a driving source configured to output a driving force that drives the first driving roller and the second driving roller, an output pulley fixed to an output shaft of the driving source, an input pulley fixed to the second driving roller, a first pulley fixed to the first driving roller, a second pulley fixed to the second driving roller, a driving belt wound around the output pulley and the input pulley, a transmission belt wound around the first pulley and the second pulley, and an image forming unit configured to form the image, read by the image reading unit from the sheet, on a different sheet.

Further features of the present invention will become apparent from the following description of exemplary embodiments with reference to the attached drawings.

DESCRIPTION OF THE EMBODIMENTS

First Embodiment

Overall Configuration

Figure 1:
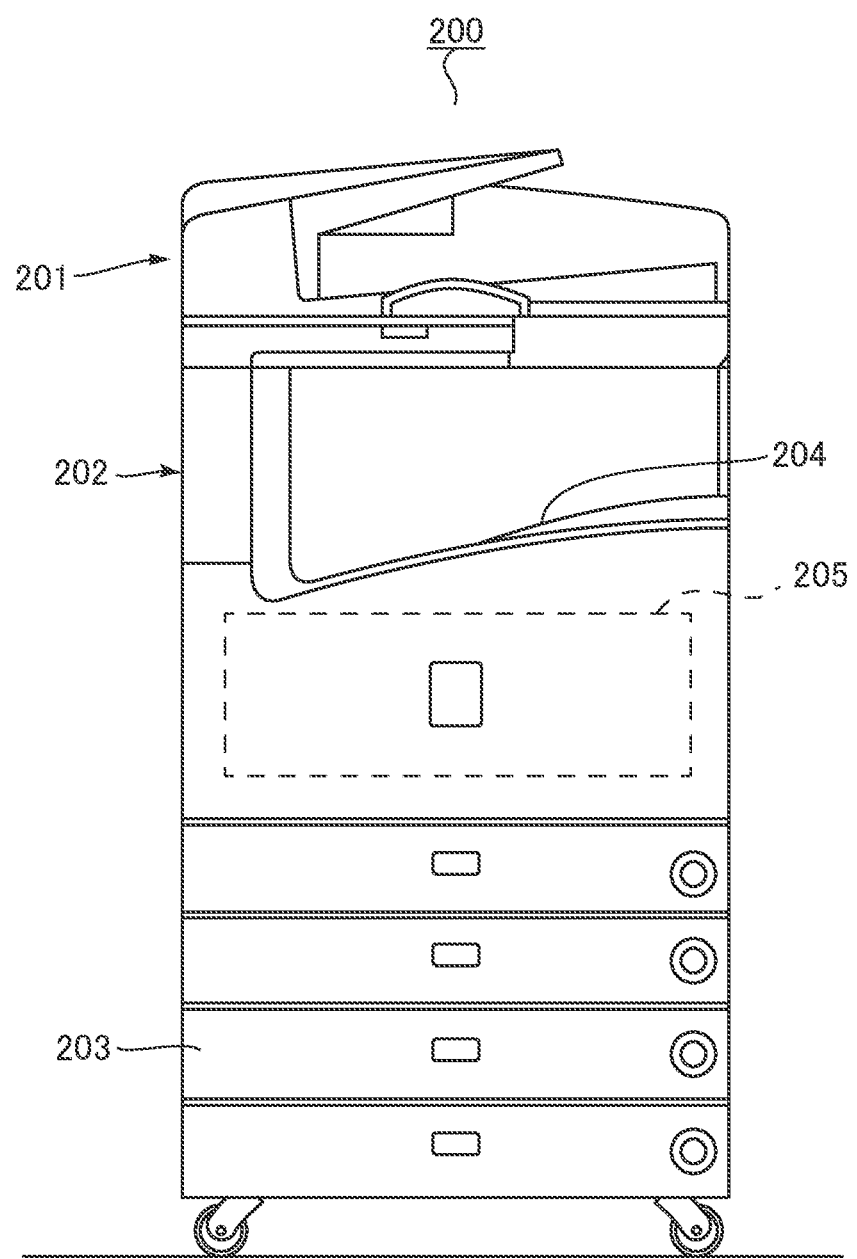
FIG. 1 is a general front view of an image forming apparatus according to a first embodiment.

An image forming apparatus 200 according to a first embodiment is a multifunction peripheral working as an electrophotographic (laser beam) system. As shown in FIG. 1, the image forming apparatus 200 includes an apparatus body 202, and an image reading apparatus 201 mounted on the top of the apparatus body 202.

The apparatus body 202 includes an image forming unit 205 that forms an image on a sheet, and a cassette 203 that holds sheets fed to the image forming unit 205. Above the image forming unit 205, a sheet discharge tray 204 is provided, to which sheets are discharged. Sheets held in the cassette 203 are fed by a feeding roller (not illustrated) or the like. The image forming unit 205 has a laser writing unit, an electrophotographic processing unit, and a fixing unit which are built in the image forming unit 205 (and are not illustrated), and forms an image on a sheet by a known electrophotographic method, the sheet being fed from the cassette 203. The sheet on which an image is formed by the image forming unit 205 is different from a document from which the image reading apparatus 201 reads an image.

Image Reading Apparatus

Figure 2:
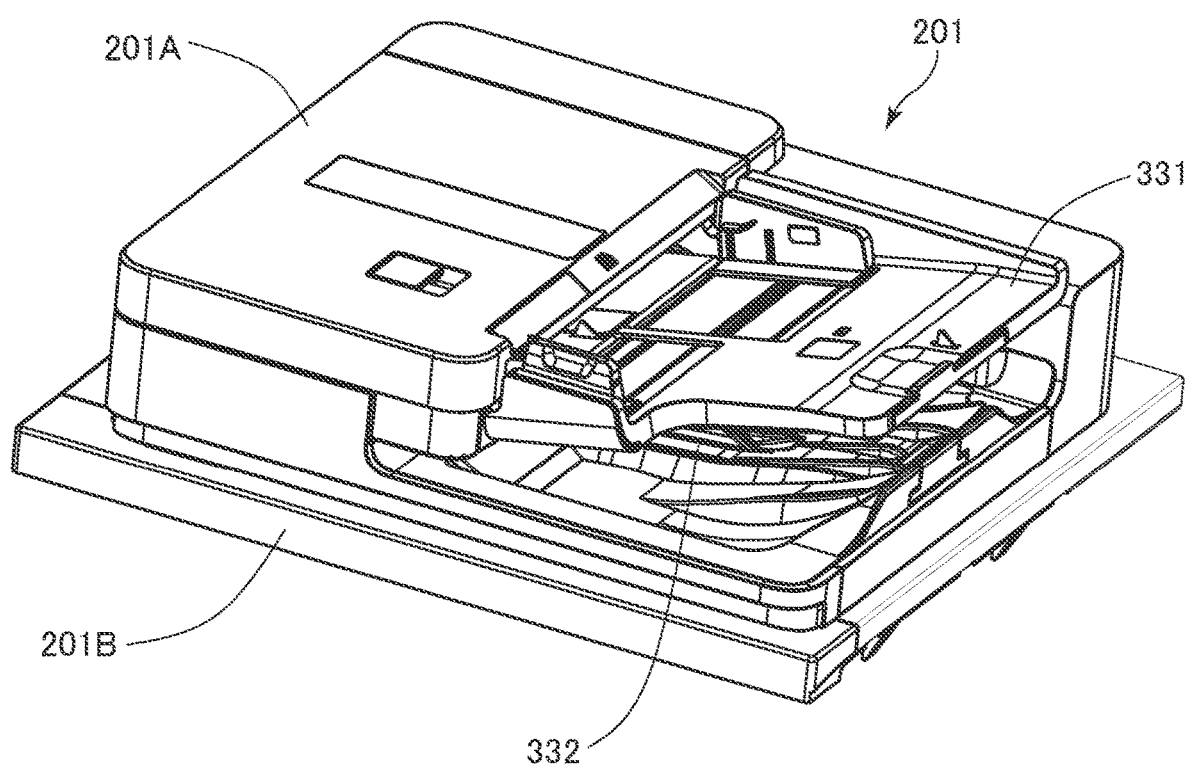
FIG. 2 is a perspective view of an image reading apparatus according to the first embodiment.
Figure 3:
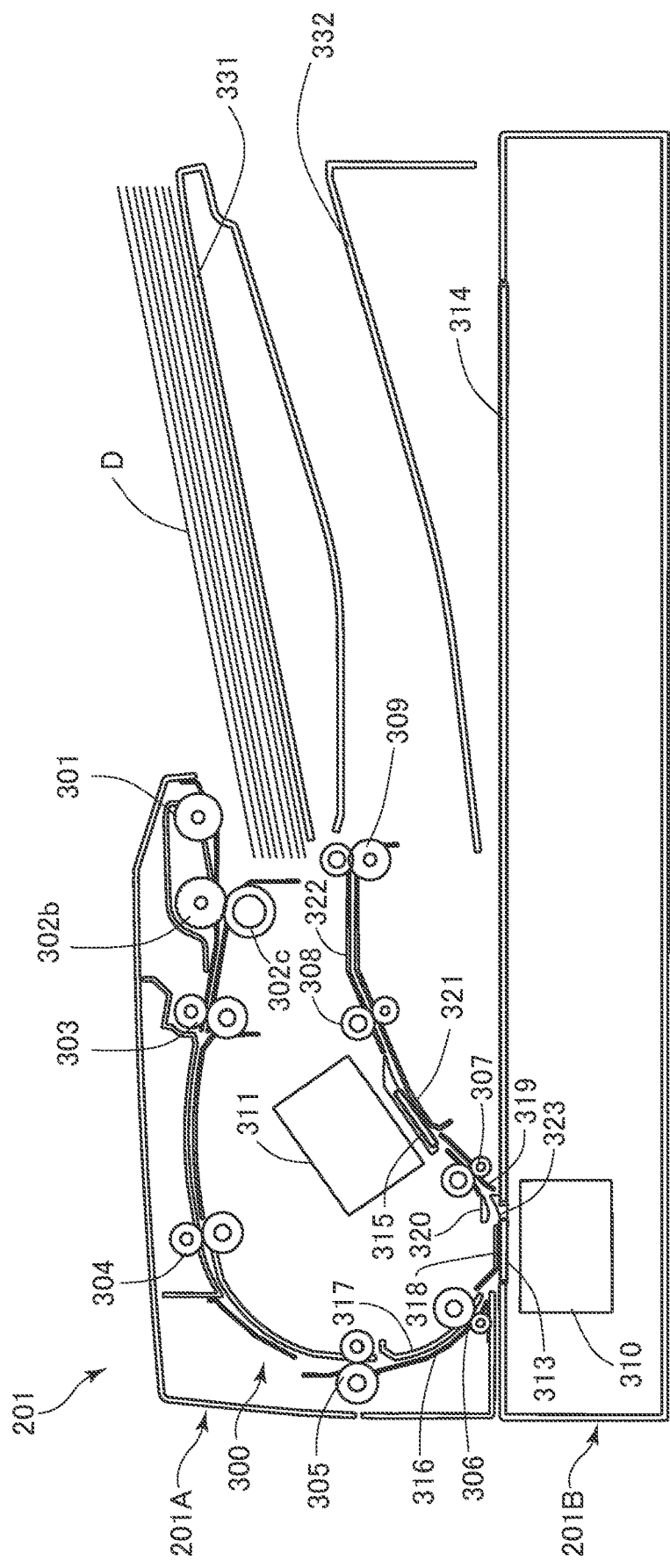
FIG. 3 is a sectional view of the image reading apparatus according to the first embodiment.

The image reading apparatus 201 will then be described in detail. As shown in FIGS. 2 and 3, the image reading apparatus 201 includes an automatic document feeder (hereinafter, "ADF") 201A that feeds documents D, which are sheets stacked on a document tray 331, and discharges documents D to a sheet discharge tray 332. The document tray 331 serves as a supporting portion configured to support documents D (sheet). The image reading apparatus 201 further includes a reading unit 201B that reads a document D conveyed by the ADF 201A. In this embodiment, a sheet refers to a recording material on which an image is formed by the image forming unit 205 and refers to a document from which an image is read by the image reading apparatus 201 as well. The document may be blank or may carry an image on its one surface or both surfaces. The ADF 201A is supported turnably on the reading unit 201B by a pivot such that a document-bearing glass 314 can be opened by turning the ADF 201A relative to the reading unit 201B.

The ADF 201A includes a pickup roller 301, a separation driving roller 302b and a separation driven roller 302c that make up a separation roller pair, a pullout conveyance roller pair 303, a pre-registration conveyance roller pair 304, and a registration roller pair 305. The ADF 201A further includes an upstream conveyance roller pair 306, an intermediate conveyance roller pair 307, a downstream conveyance roller pair 308, and a sheet discharge roller pair 309, which serve as conveyance units. The ADF 201A includes also an image reading unit 311 serving as a second image reading unit that reads a back surface opposite to a front surface of the document D, the back surface being a second surface of the document D. The reading unit 201B includes a platen glass 313, the document-bearing glass 314, and an image reading unit 310 serving as a first image reading unit that reads the front surface, i.e., a first surface of the document D. The above roller pairs make up a conveyance unit 300 that conveys sheets. The conveyance unit 300 conveys documents D stacked on the document tray 331, from the document tray 331 to the sheet discharge tray 332 located under the document tray 331 through a U-shaped conveyance path.

The image reading apparatus 201 reads image information from the document D in the following operation modes: a feeding-reading mode in which an image on the document D is scanned as documents D stacked on the document tray 331 are fed by the ADF 201A and a fixed-reading mode in which the document placed on the document-bearing glass 314 is scanned. The feeding-reading mode, which is generally referred to as sheet-through method, is selected when a document detection sensor (not illustrated) detects the document D placed on the document tray 331 or a user gives a clear instruction to execute the feeding-reading mode, using an operation panel, etc (not illustrated).

When the feeding-reading mode is executed, the pickup roller 301 moves down and comes in contact with the document D on the top of a stack of documents D on the document tray 331. The pickup roller 301 then feeds documents D to the roller pair composed of the separation driving roller 302b and the separation driven roller 302c, where the documents D are caught one by one by a separation nip formed by the separation driving roller 302b and the separation driven roller 302c. The separation driven roller 302c has a rotation support structure including a torque limiter, because of which the separation driven roller 302c rotates by following the separation driving roller 302b when one document is fed to the separation driven roller 302c, while the separation driven roller 302c does not rotate when two or more documents are fed to the separation driven roller 302c. Documents are thus separated one by one. The separation driven roller 302c may be supplied with a driving force that causes it to rotate in a direction opposite to a sheet feeding direction.

The document D having passed through the separation nip travels to the pullout conveyance roller pair 303 and the pre-registration conveyance roller pair 304, which convey the document D to the registration roller pair 305. Then, the leading edge of the document D runs into the registration roller pair 305 in a stopped state, where a skew position of the document D is corrected. The document D, whose skew position has been corrected, is further conveyed by the registration roller pair 305, thus traveling to the upstream conveyance roller pair 306 while being guided by a conveyance guide 316 and a conveyance guide 317, which serve as guide members that guide the document D. The document D nipped by the upstream conveyance roller pair 306 is sent to a space between the platen glass 313 and a platen guide 318 serving as a guide member, where an image on the front surface is read by the image reading unit 310.

The leading edge of the document D is then conveyed by a jump table 323 serving as a guide member, from the platen guide 318 to a space between a conveyance guide 319 and a conveyance guide 320, which serve as guide members. When the leading edge of the document D reaches the intermediate conveyance roller pair 307, the document D is nipped by the intermediate conveyance roller pair 307. The document D conveyed by the upstream conveyance roller pair 306 and the intermediate conveyance roller pair 307 travels into a space between a back surface reading glass 315 and a conveyance guide 322 serving as a guide member, and a back surface reading guide 321 serving as a guide member. The document D then has an image on its back surface read by the image reading unit 311.

Thereafter, when the leading edge of the document D, which is guided by the back surface reading guide 321 and the conveyance guide 322, reaches the downstream conveyance roller pair 308, the document D is nipped by the downstream conveyance roller pair 308 and is further conveyed to the sheet discharge roller pair 309. The document D, whose front surface and back surface have been read, is then discharged by the sheet discharge roller pair 309 onto the sheet discharge tray 332. Image information, which is photoelectrically converted by light-receiving elements of line sensors of the image reading units 310 and 311, the light-receiving elements being CCDs or the like (not illustrated), is transferred to a control unit (not illustrated).

In the image reading apparatus 201, to allow conveyance of a document D of a small size, such as a business card, roller pairs are arranged in such a way as to determine a conveyance path length, which is an interval between different roller pairs, to be 80 mm or less (relative to, for example, the length of an ordinary business card, which is 85 mm). For example, a document of a normal sheet size (A3 size to A5 size) is conveyed as it is held by two or three of three roller pairs: the upstream conveyance roller pair 306, the intermediate conveyance roller pair 307, and the downstream conveyance roller pair 308. A small document ranging from business-card-sized one to A5-sized one, on the other hand, is conveyed as it is held by one or two of the three roller pairs.

A conveyance path from the upstream conveyance roller pair 306 to a reading position of the image reading unit 310 and a conveyance path from the reading position of the image reading unit 310 to the intermediate conveyance roller pair 307 are curved conveyance paths. On these paths, when a thick document, such as a business card, is transferred, the pressure of the document to each conveyance guide is larger. When an image on the front surface is read by the image reading unit 310, in particular, the document is conveyed as a frictional resistance (and its change) between the document and the conveyance path is larger. In contrast, a conveyance path from the intermediate conveyance roller pair 307 to a reading position of the image reading unit 311, which reads an image on the back surface, and a conveyance path from the image reading unit 311 to the downstream conveyance roller pair 308 are paths with less curve (paths that are almost straight). When an image on the back surface is read by the image reading unit 311, therefore, the document is conveyed as a frictional resistance (and its change) between the document and the conveyance guide is smaller. In this manner, the frictional resistance that develops between the sheet and each conveyance guide when the image is read by the image reading unit 310 is larger than the frictional resistance that develops between the sheet and each conveyance guide when the image is read by the image reading unit 311.

The fixed-reading mode is selected when the apparatus detects the document D placed on the document-bearing glass 314 or the user gives a clear instruction to execute the fixed-reading mode, using the operation panel, etc (not illustrated). In this case, the document D on the document-bearing glass 314 remains stationary, and the image reading unit 310 moves along the document-bearing glass 314 to scan the document D. As in the feeding-reading mode, image information, which is photoelectrically converted by the light-receiving element of the line sensor (not illustrated) of the image reading unit 310, is transferred to the control unit (not illustrated).

Configuration of Each Conveyance Roller Pair and Driving Unit for Driving the Conveyance Roller Pair Configurations of the registration roller pair 305, the upstream conveyance roller pair 306, the intermediate conveyance roller pair 307, and the downstream conveyance roller pair 308, and the driving unit 400 that drive these roller pairs will then be described with reference to FIGS. 4 and 5. As described above, in the image reading apparatus 201, the registration roller pair 305, the upstream conveyance roller pair 306, the intermediate conveyance roller pair 307, and the downstream conveyance roller pair 308 are arranged in this order from the upstream side to the downstream side in the sheet conveyance direction. The image reading unit 310, which reads the front surface, is disposed between the upstream conveyance roller pair 306 and the intermediate conveyance roller pair 307, and the image reading unit 311, which reads the back surface, is disposed between the intermediate conveyance roller pair 307 and the downstream conveyance roller pair 308. In other words, the upstream conveyance roller pair 306 is, among a plurality of roller pairs located upstream to the image reading unit 310 in the sheet conveyance direction, located closest to the image reading unit 310. The downstream conveyance roller pair 308 is, among a plurality of roller pairs located downstream to the image reading unit 311 in the sheet conveyance direction, located closest to the image reading unit 311. The intermediate conveyance roller pair 307 is located between the image reading unit 310 and the image reading unit 311. In the sheet conveyance direction, a driven roller different from a driving roller and not supplied with a driving force, may be disposed between the upstream conveyance roller pair 306 and a reading position 310a (see FIGS. 6A to 6D, described later) or between the downstream conveyance roller pair 308 and the reading position 310a.

Figure 4:
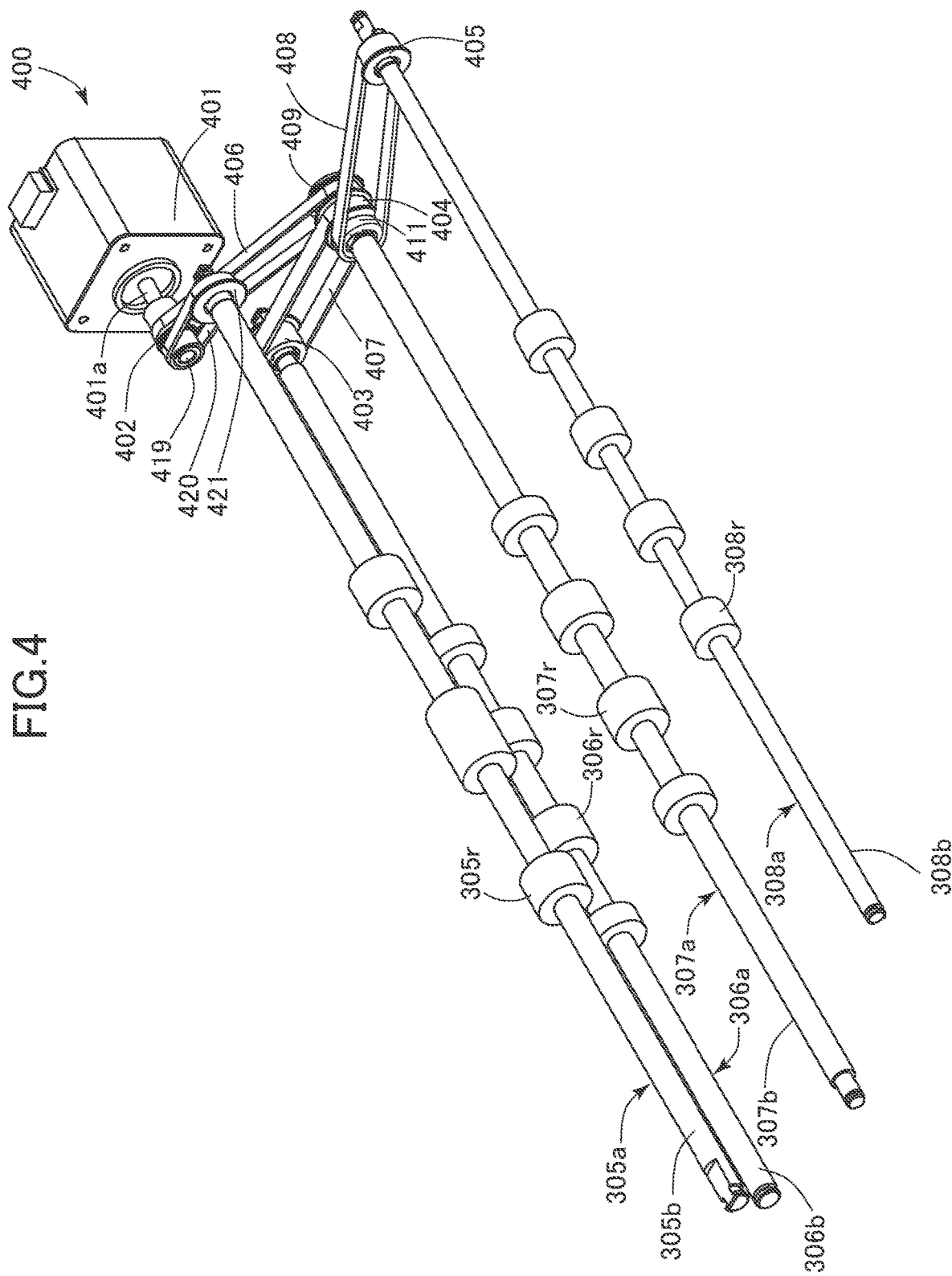
FIG. 4 is a perspective view of conveyance rollers and a driving unit according to the first embodiment.

As shown in FIG. 4, the registration roller pair 305 includes a registration driving roller 305a and a driven roller (not illustrated), and the registration driving roller 305a has a plurality of roller portions 305r fixed to a drive shaft 305b, the roller portions 305r coming in contact with the document D. Similarly, the upstream conveyance roller pair 306 includes an upstream driving roller 306a, which is a first driving roller, and a driven roller (not illustrated), and the upstream driving roller 306a has a plurality of roller portions 306r fixed to a drive shaft 306b, the roller portions 306r coming in contact with the document D. Similarly, the intermediate conveyance roller pair 307 includes an intermediate driving roller 307a, which is a second driving roller, and a driven roller (not illustrated), and the intermediate driving roller 307a has a plurality of roller portions 307r fixed to a drive shaft 307b, the roller portions 307r coming in contact with the document D. Similarly, the downstream conveyance roller pair 308 includes a downstream driving roller 308a, which is a third driving roller, and a driven roller (not illustrated), and the downstream driving roller 308a has a plurality of roller portions 308r fixed to a drive shaft 308b, the roller portions 308r coming in contact with the document D.

Figure 5:
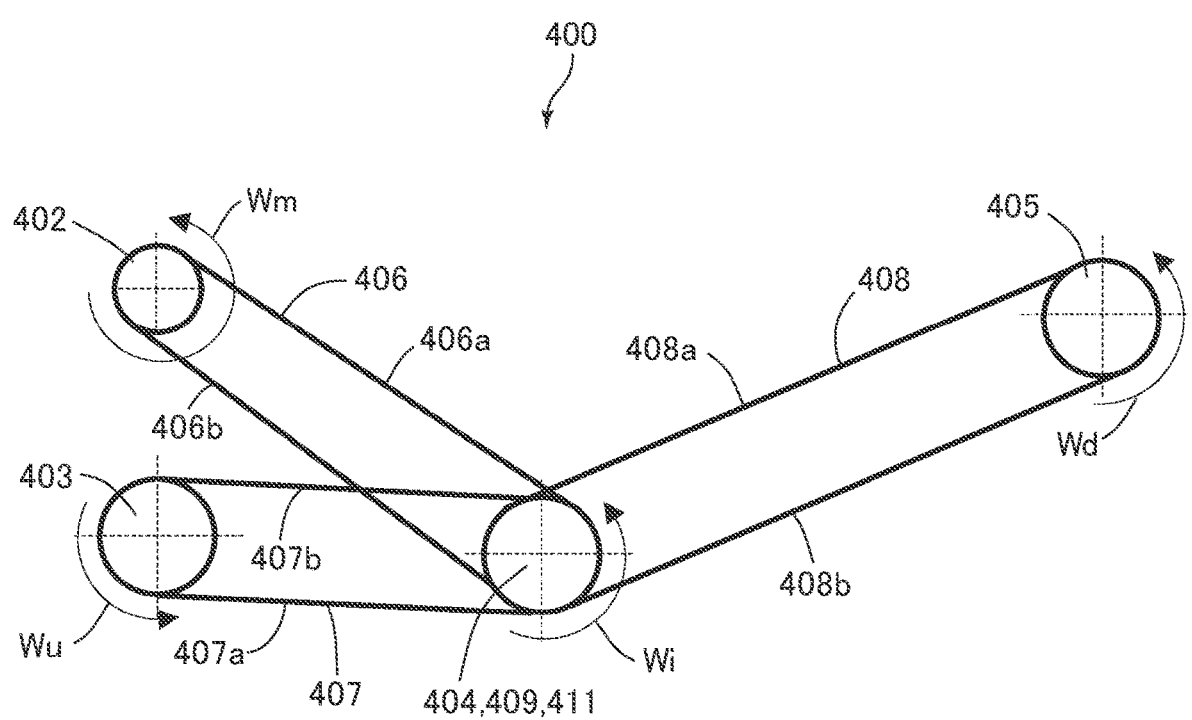
FIG. 5 is a schematic diagram of the driving unit according to the first embodiment.

As shown in FIGS. 4 and 5, the driving unit 400 includes a motor 401 serving as a driving source, and an output pulley 402 and an output pulley 419 that are fixed to an output shaft 401a of the motor 401. The driving unit 400 further includes a registration pulley 421 fixed to the drive shaft 305b of the registration driving roller 305a. The driving unit 400 further includes an upstream pulley 403 serving as a first pulley, the upstream pulley 403 being fixed to the drive shaft 306b of the upstream driving roller 306a. The driving unit 400 further includes an intermediate pulley 404 serving as a second pulley, the intermediate pulley 404 being fixed to the drive shaft 307b of the intermediate driving roller 307a. The driving unit 400 further includes an intermediate pulley 411 serving as a fourth pulley, the intermediate pulley 411 being fixed to the drive shaft 307b of the intermediate driving roller 307a. The driving unit 400 further includes an input pulley 409 fixed to the drive shaft 307b of the intermediate driving roller 307a. The driving unit 400 further includes a downstream pulley 405 serving as a third pulley, the downstream pulley 405 being fixed to the drive shaft 308b of the downstream driving roller 308a. The intermediate pulley 404, the intermediate pulley 411, and the input pulley 409 may be a portion formed integrally into a single portion, or may be formed respectively as separate portions.

The driving unit 400 includes a driving belt 420 wound around the output pulley 419 and the registration pulley 421, and a driving belt 406 wound around the output pulley 402 and the input pulley 409. The driving unit 400 further includes a transmission belt 407 serving as a first transmission belt, the transmission belt 407 being wound around the upstream pulley 403 and the intermediate pulley 404, and a transmission belt 408 serving as a second transmission belt, the transmission belt 408 being wound around the downstream pulley 405 and the intermediate pulley 411.

At the driving unit 400 configured in the above manner, the motor 401 rotates to output a driving force. As a result, a torque is inputted to the registration pulley 421 via the output pulley 419 and the driving belt 420, which causes the registration driving roller 305a to rotate. When the motor 401 rotates to output the driving force, a torque is inputted also to the input pulley 409 via the output pulley 402 and the driving belt 406. The torque is thus transmitted to the intermediate pulleys 404 and 411 to which the input pulley 409 is fixed. This causes the intermediate driving roller 307a to rotate, and at the same time, the torque transmitted to the upstream pulley 403 via the transmission belt 407 causes the upstream pulley 403 to rotate as the torque transmitted to the downstream pulley 405 via the transmission belt 408 causes the downstream pulley 405 to rotate. Hence the upstream driving roller 306a and the downstream driving roller 308a are caused to rotate.

At this time, the motor 401 is controlled to rotate at a constant rotational speed Wm [rad/s] in an arrowed direction in FIG. 4, and the output pulley 402 also rotates at the same rotational speed Wm. As a result, receiving the torque via the driving belt 406, the input pulley 409, the intermediate pulley 404, the intermediate pulley 411, and the intermediate driving roller 307a rotate at a rotational speed Wi [rad/s]. At the same time, receiving the torque via the transmission belt 407, the upstream pulley 403 and the upstream driving roller 306a rotate at a rotational speed Wu [rad/s]. Likewise, receiving the torque via the transmission belt 408, the downstream pulley 405 and the downstream driving roller 308a rotate at a rotational speed Wd [rad/s]. It should be noted that if each pulley has the same radius and a load applied to each roller, the load resulting from friction between the sheet and the conveyance path, does not change when the motor 401 rotates at the constant rotational speed Wm, the rotational speeds Wu, Wi, and Wd are the same rotational speed. In this manner, the driving unit 400 of the image reading apparatus 201 is configured to drive four rollers by one motor 401, thus allowing miniaturization and cost reduction.

Speed Change that Occurs when Trailing Edge of Document Comes Out of Upstream Conveyance Roller Pair A speed change that occurs when the trailing edge of the document D comes out of the upstream conveyance roller pair 306, the document D being a thick sheet of a business card size, e.g., 85 mm in length and carrying an image to be read, will then be described with reference to FIGS. 6A to 9.

Figure 6A:
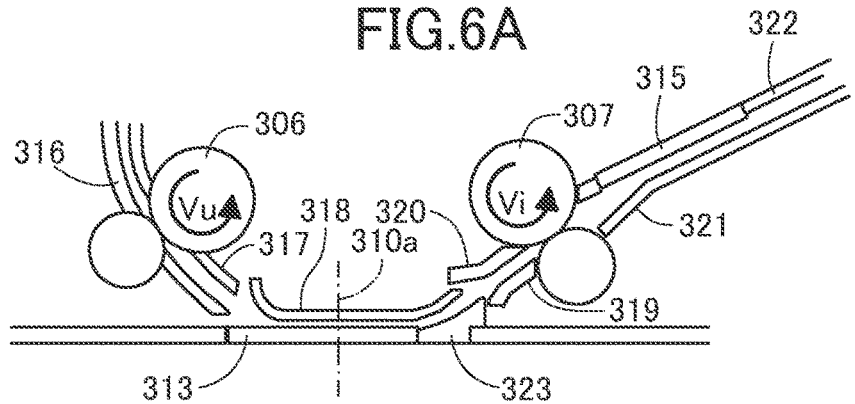
FIG. 6A is a schematic diagram of a conveyance path on which an upstream conveyance roller pair and an intermediate conveyance roller pair are arranged.

As shown in FIG. 6A, when no document D is conveyed, the motor 401 causes the upstream conveyance roller pair 306 and the intermediate conveyance roller pair 307 to rotate. At this time, a surface rotational speed Vi of the intermediate conveyance roller pair 307 is given by multiplying the rotational speed Wi by the radius Ri of the roller portion 307r (Vi=Wi×Ri). A surface rotational speed Vu of the upstream conveyance roller pair 306 is given by multiplying the rotational speed Wu by the radius Ru of the roller portion 306r (Vu=Wu×Ru).

Figure 6B:
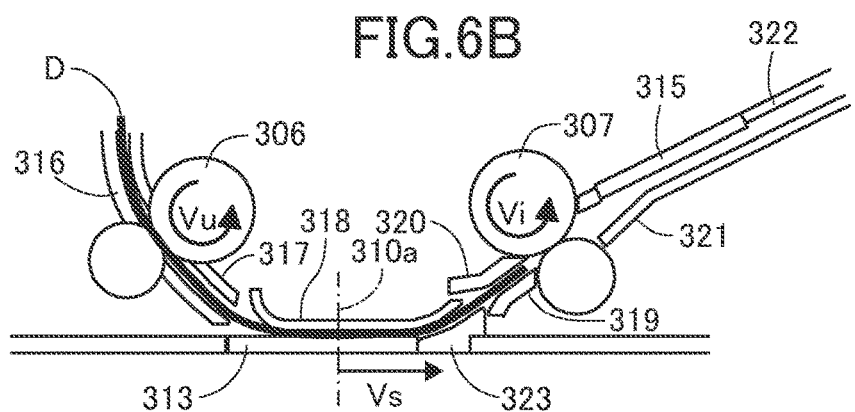
FIG. 6B is a schematic diagram showing a state in which a document is conveyed by the upstream conveyance roller pair.
Figure 6C:
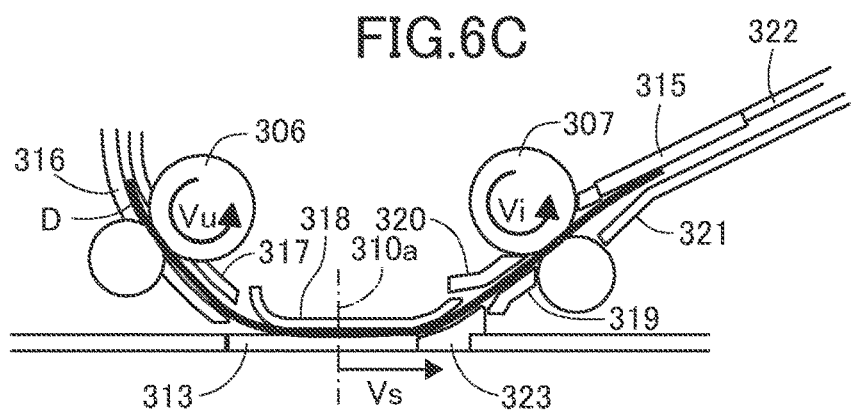
FIG. 6C is a schematic diagram showing a state in which the document is conveyed by the upstream conveyance roller pair and the intermediate conveyance roller pair.
Figure 6D:
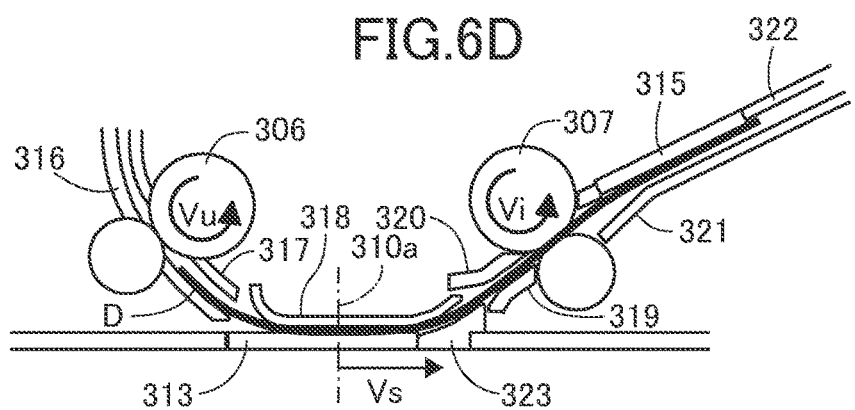
FIG. 6D is a schematic diagram showing a state in which the document with its trailing edge having come out of the upstream conveyance roller pair is conveyed by the intermediate conveyance roller pair.

When the document D reaches the upstream conveyance roller pair 306, the document D is first conveyed by the upstream conveyance roller pair 306 only, as shown in FIG. 6B. Subsequently, when the leading edge of the document D reaches the intermediate conveyance roller pair 307, as shown in FIG. 6C, the document D is conveyed by both the upstream conveyance roller pair 306 and the intermediate conveyance roller pair 307. Thereafter, when the trailing edge of the document D has come out of the upstream conveyance roller pair 306, as shown in FIG. 6D, the document D is conveyed by the intermediate conveyance roller pair 307 only. A change in the conveyance speed Vs of the document D at the reading position 310a of the image reading unit 310, in particular, affects a change in the surface rotational speed Vi of the intermediate conveyance roller pair 307 that occurs when the trailing edge of the document D comes out of the upstream conveyance roller pair 306. This means that by reducing the change in the surface rotational speed Vi of the intermediate conveyance roller pair 307, the change in the conveyance speed Vs of the document D can be reduced.

Figure 7A:
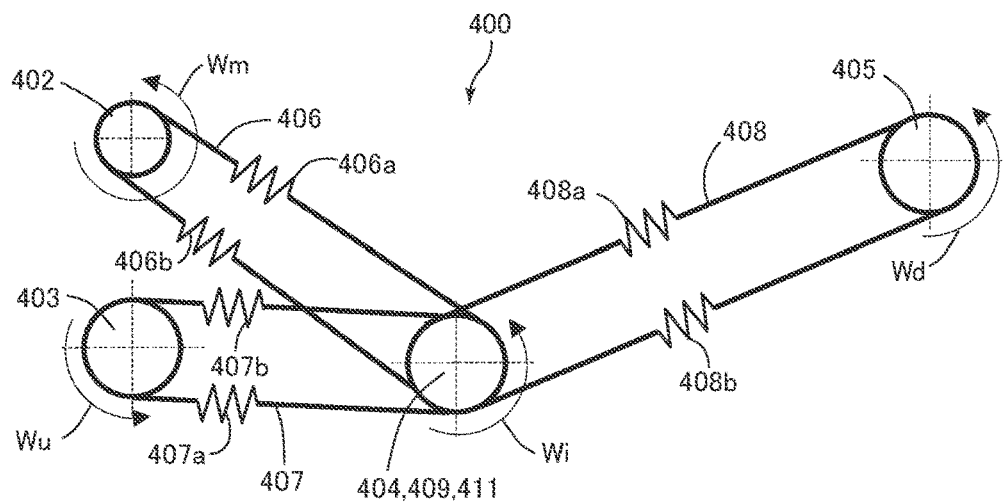
FIG. 7A is a schematic diagram of a state of the driving unit according to the first embodiment when no document is conveyed.
Figure 7B:
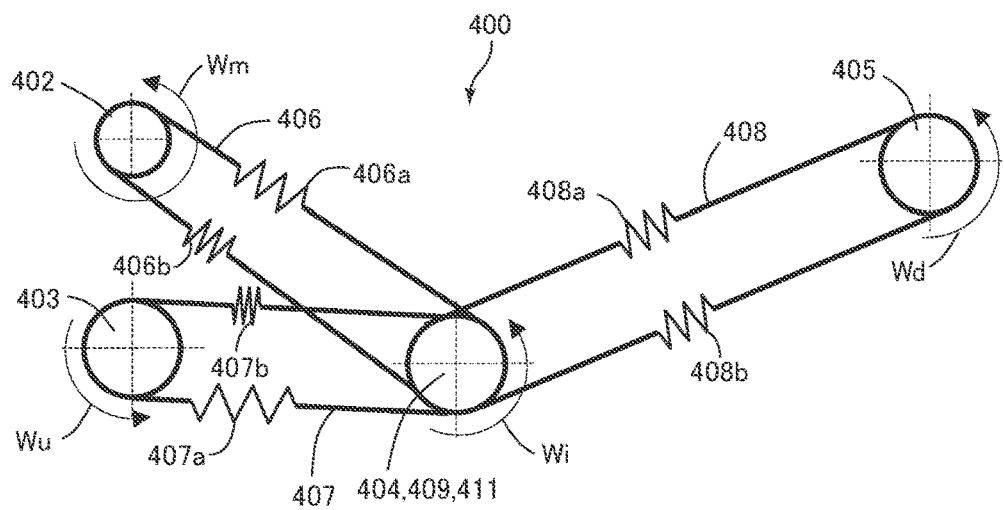
FIG. 7B is a schematic diagram of a state of the driving unit according to the first embodiment when the document is conveyed by the upstream conveyance roller pair.
Figure 7C:
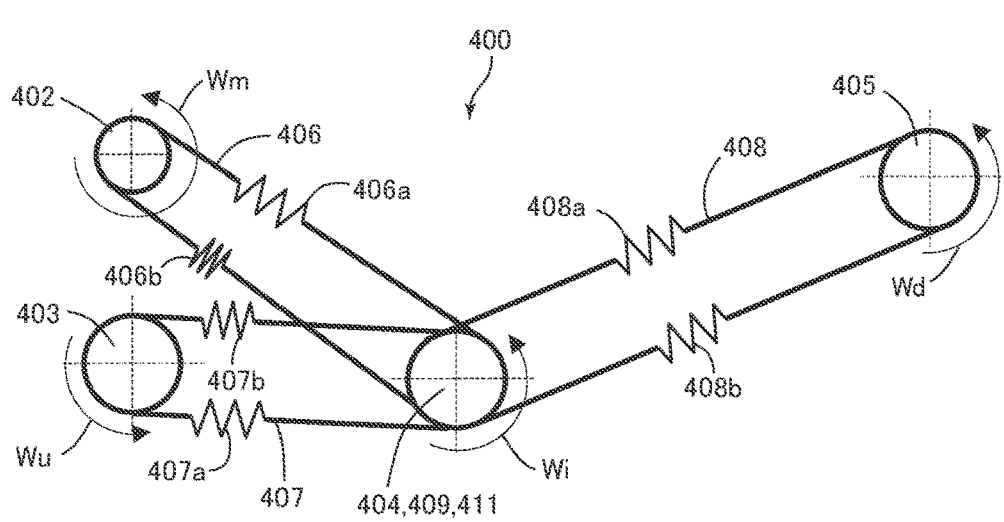
FIG. 7C is a schematic diagram of a state of the driving unit according to the first embodiment when the document is conveyed by the upstream conveyance roller pair and the intermediate conveyance roller pair.

The above driving belt 406, transmission belt 407, and transmission belt 408 each have a structure in which, for example, an inner core is covered with rubber (or urethane), that is, they are each made of an elastic material. Each belt stretched between pulleys has a tension side and a slack side that arise depending on the direction of rotation of the belt. As shown in FIGS. 7A to 7C, the driving belt 406 has a tension side 406a and a slack side 406b, the transmission belt 407 has a tension side 407a and a slack side 407b, and the transmission belt 408 has a tension side 408a and a slack side 408b. It should be noted that FIGS. 7A to 7C are schematic diagrams of belts in which spring symbols are used to indicate degrees of extension/contraction of the belts, and that each belt actually has no spring.

As shown in FIG. 7A, when no document D is conveyed (see FIG. 6A), no load is applied from the document D to rollers, and therefore the tension side and the slack side of each belt are substantially in the same state of extension/contraction. In a state in which the document D reaches the upstream conveyance roller pair 306 and the upstream conveyance roller pair 306 solely conveys the document D (see FIG. 6B), a frictional resistance between the document D and the curved conveyance guides 316 and 317 arises at the upstream conveyance roller pair 306 only. As a result, as shown in FIG. 7B, a large load torque is applied from the upstream driving roller 306a of the upstream conveyance roller pair 306 to the upstream pulley 403, which in turn applies a tension to the tension side 407a of the transmission belt 407, thus causing the tension side 407a to extend. The tension is applied also to the tension side 406a of the driving belt 406 via the transmission belt 407, the intermediate pulley 404, and the input pulley 409, thus causing the tension side 406a to extend.

Thereafter, in a state in which the document D reaches the intermediate conveyance roller pair 307 and the upstream conveyance roller pair 306 and the intermediate conveyance roller pair 307 convey the document D (see FIG. 6C), the frictional resistance caused by the document D arises at both the upstream conveyance roller pair 306 and the intermediate conveyance roller pair 307. In this case, the load torque originating from the document D is distributed between the upstream conveyance roller pair 306 and the intermediate conveyance roller pair 307, and, consequently, the tension applied to the tension side 407a of the transmission belt 407 shrinks, as shown in FIG. 7C. Meanwhile, the load torque applied to the intermediate conveyance roller pair 307 increases, and therefore the tension applied to the tension side 406a of the driving belt 406 increases.

Figure 8A:
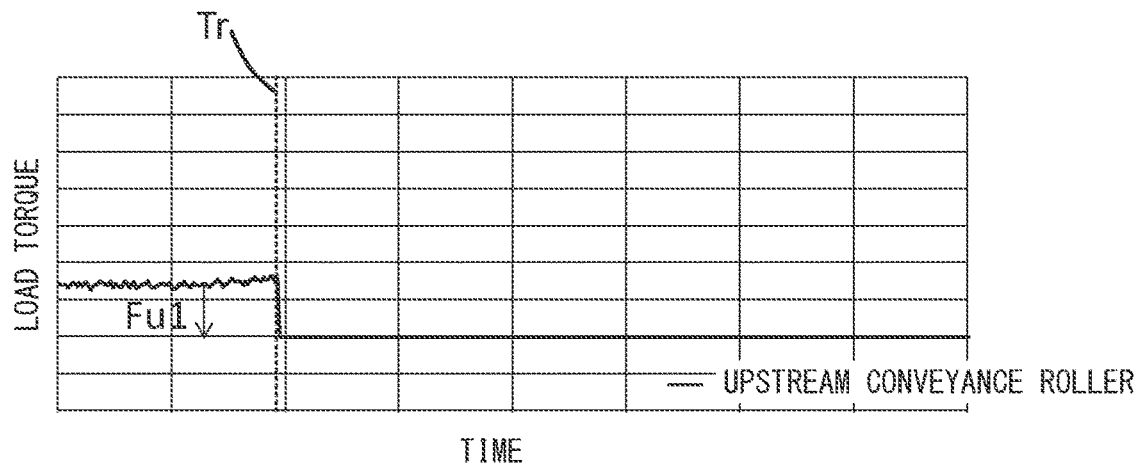
FIG. 8A depicts a load torque that is applied to the upstream conveyance roller pair when the trailing edge of the document comes out of the upstream conveyance roller pair.
Figure 8B:
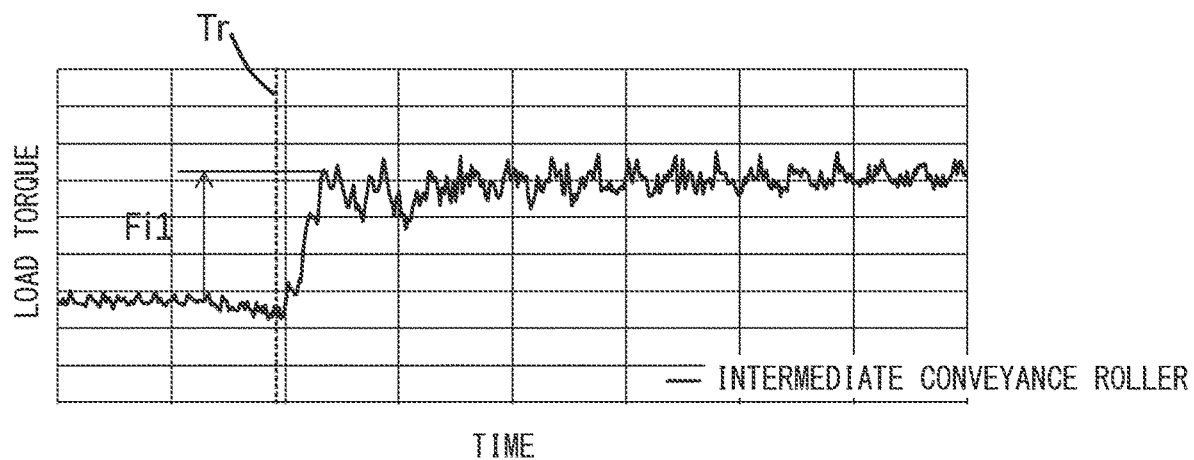
FIG. 8B depicts a load torque that is applied to the intermediate conveyance roller pair when the trailing edge of the document passes through the upstream conveyance roller pair.

Then, when the trailing edge of the document D has come out of the upstream conveyance roller pair 306 (see FIG. 6D), the load torque applied from the document D to the upstream conveyance roller pair 306 becomes zero, which leaves the load torque applied from the document D to the intermediate conveyance roller pair 307 only. As shown in FIG. 8A, at a point of time Tr at which the trailing edge of the document D comes out of the upstream conveyance roller pair 306, the load torque Fu1 applied from the document D to the upstream conveyance roller pair 306 decreases (substantially becomes zero). As shown in FIG. 8B, at the point of time Tr at which the trailing edge of the document D comes out of the upstream conveyance roller pair 306, the load torque applied from the document D to the intermediate conveyance roller pair 307 increases by an increment Fi1.

At arrival of this point of time Tr, the load torque to the intermediate conveyance roller pair 307 increases by the increment Fi1, and because of this, the surface rotational speed Vi of the intermediate conveyance roller pair 307 decreases. However, since the intermediate conveyance roller pair 307 is connected to the motor 401 via the input pulley 409, the driving belt 406, and the output pulley 402, a decrease in the surface rotational speed Vi is suppressed. Particularly, because the tension side 406a of the driving belt 406 is already stretched to some extent due to the frictional resistance caused by the document D, the drop in the surface rotational speed Vi is suppressed.

Figure 9:
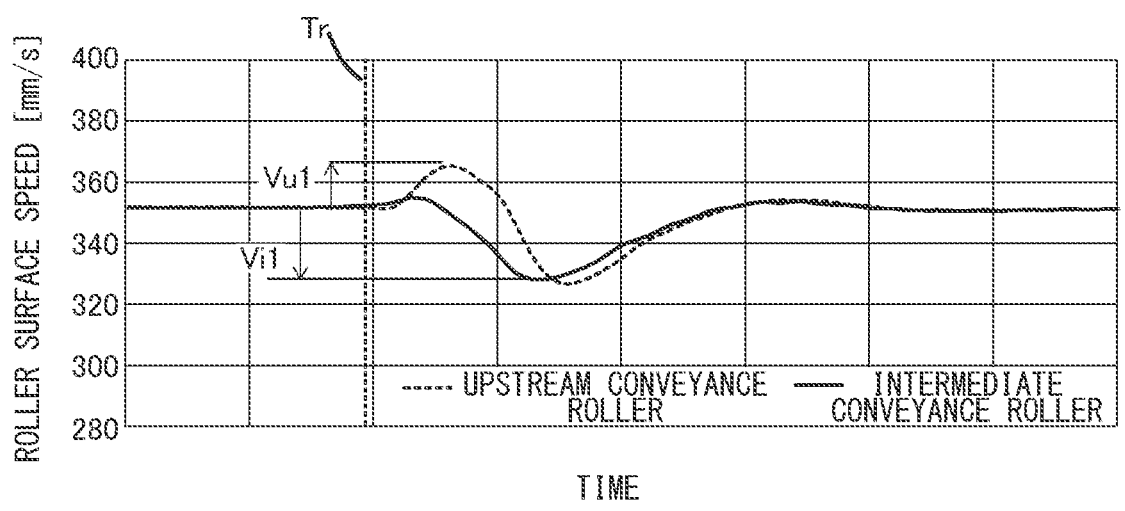
FIG. 9 depicts respective roller surface speeds of the upstream conveyance roller pair and the intermediate conveyance roller pair when the trailing edge of the document comes out of the upstream conveyance roller pair.

A decrease in the load torque applied to the upstream conveyance roller pair 306 eliminates an extension of the tension side 407a of the transmission belt 407 in an amount corresponding to an amount of decrease in the load torque. As a result, the surface rotational speed Vu of the upstream conveyance roller pair 306 temporarily increases by an increment Vu1, as shown in FIG. 9. After the surface rotational speed Vu of the upstream conveyance roller pair 306 increases, a torque generated by the moment of inertia is maintained for a little while. This torque is transmitted to the intermediate conveyance roller pair 307 via the slack side 407b of the transmission belt 407, which suppresses a decrease in the surface rotational speed Vi of the intermediate conveyance roller pair 307. Hence a change in the surface rotational speed Vi of the intermediate conveyance roller pair 307 is reduced, which reduces a change in the conveyance speed Vs of the document D.

Meanwhile, the downstream conveyance roller pair 308 is kept rotated by the transmission belt 408 when the trailing edge of the document D has come out of the upstream conveyance roller pair 306. When the surface rotational speed Vi of the intermediate conveyance roller pair 307 decreases, therefore, a torque generated by the moment of inertia is transmitted from the downstream conveyance roller pair 308 in a state of rotation to the intermediate conveyance roller pair 307 via the transmission belt 408, which contributes to suppression of the decrease in the surface rotational speed Vi. This effect is combined with the effect of the increase in the surface rotational speed Vu of the upstream conveyance roller pair 306 to offer a total effect of suppressing the decrease in the surface rotational speed Vi of the intermediate conveyance roller pair 307. Hence a change in the surface rotational speed Vi of the intermediate conveyance roller pair 307 is reduced, which reduces a change in the conveyance speed Vs of the document D.

Comparison Between First Embodiment and Comparative Examples

An effect of reducing a change in the surface rotational speed Vi of the intermediate conveyance roller pair 307 according to the first embodiment will then be described with reference to FIGS. 12A to 15C, by comparing the first embodiment with a first comparative example to a third comparative example. The first comparative example to the third comparative example are different from each other in a pattern of connection between the belts that transmit a torque from the motor 401 to the roller pairs, respectively. Except this respect, the first comparative example to the third comparative example are identical in configuration with the first embodiment. The same constituent elements therefore will be denoted by the same reference numerals and will be omitted in further description.

First Comparative Example

Figure 12A:
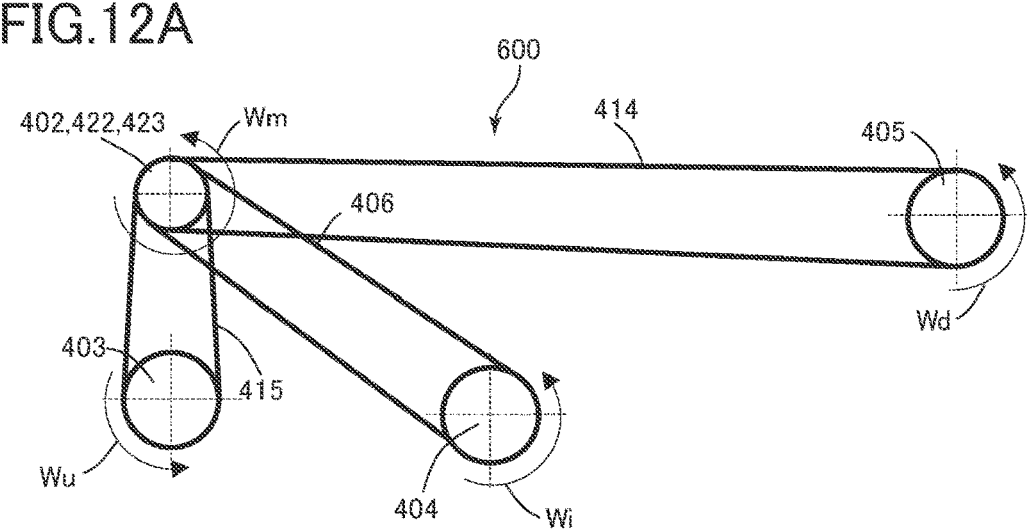
FIG. 12A is a schematic diagram of the driving unit according to a first comparative example.
Figure 12B:
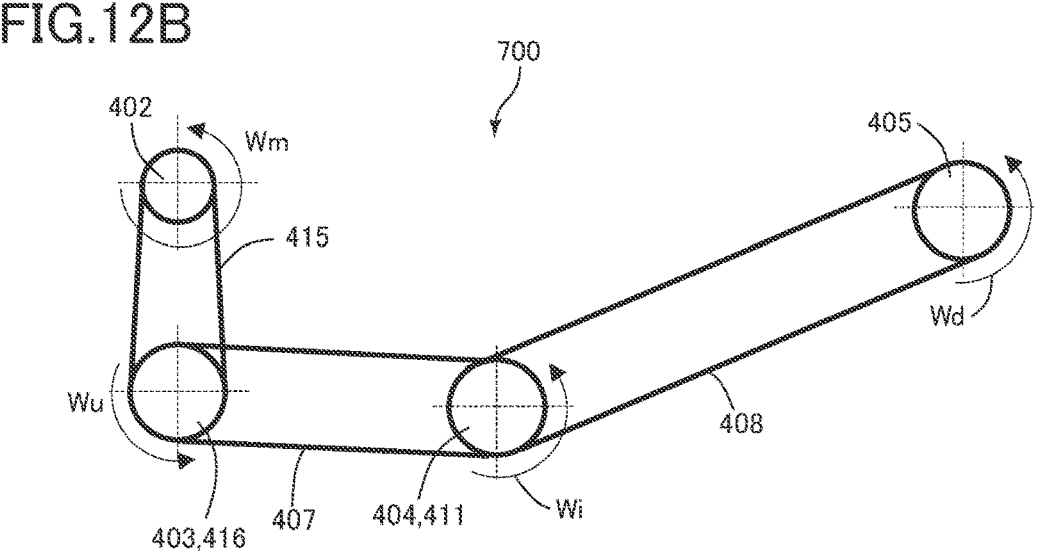
FIG. 12B is a schematic diagram of a driving unit according to a second comparative example.
Figure 12C:
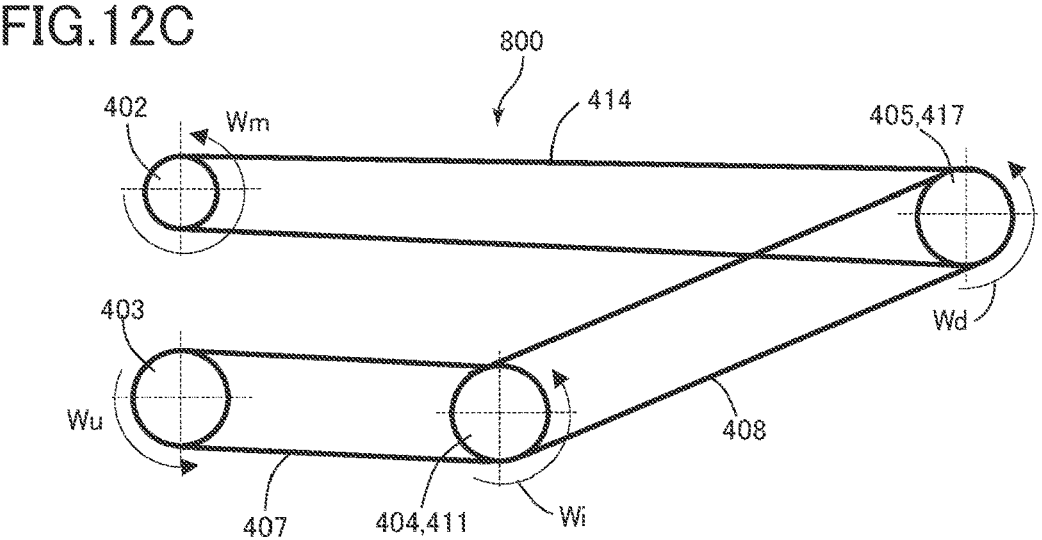
FIG. 12C is a schematic diagram of a driving unit according to a third comparative example.
Figure 15A:
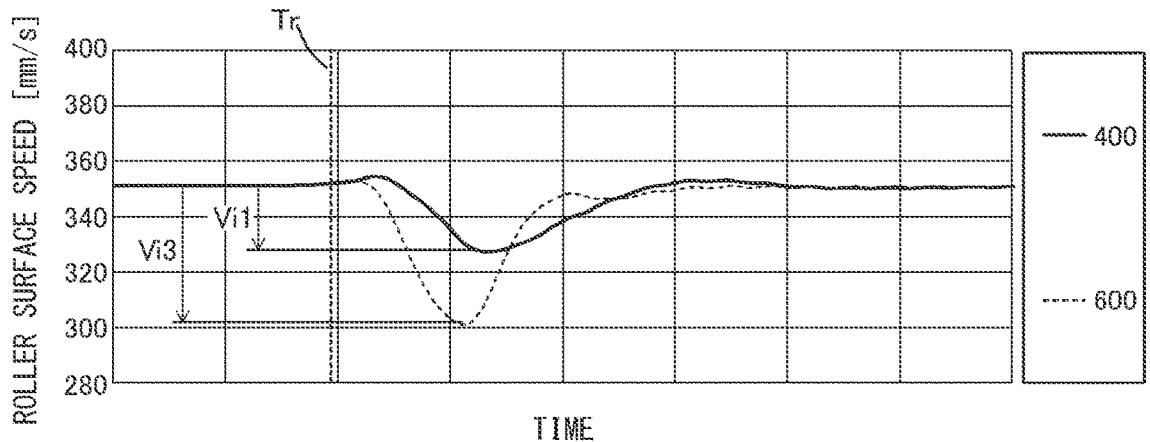
FIG. 15A depicts respective roller surface speeds of the intermediate conveyance roller pairs according to the first embodiment and the first comparative example when the trailing edge of the document comes out of the upstream conveyance roller pair.

A first comparative example will first be described with reference to FIGS. 12A and 15A. A driving unit 600 according to the first comparative example is configured such that the output shaft 401a of the motor 401 is provided with an output pulley 422 and an output pulley 423, in addition to the output pulley 402. The output pulley 422 and the upstream pulley 403 are connected by a driving belt 415, the output pulley 402 and the intermediate pulley 411 are connected by the driving belt 406, and the output pulley 423 and the downstream pulley 405 are connected by a driving belt 414.

In the first comparative example configured in this manner, the upstream conveyance roller pair 306 and the motor 401 are connected by the driving belt 415, but the upstream conveyance roller pair 306 and the intermediate conveyance roller pair 307 are not connected by a transmission belt. Because of this configuration, when the trailing edge of the document D has come out of the upstream conveyance roller pair 306, the surface rotational speed Vi of the upstream conveyance roller pair 306 hardly increases, and even if the surface rotational speed Vi of the upstream conveyance roller pair 306 increases, the increase of the surface rotational speed Vi is hardly transmitted to the intermediate conveyance roller pair 307. As a result, when the frictional resistance caused by the document D is applied only to the intermediate conveyance roller pair 307 and its surface rotational speed Vi decreases as a consequence, a change in the surface rotational speed Vi is hardly reduced. FIG. 15A demonstrates that a decrement Vi3 of the surface rotational speed Vi of the intermediate conveyance roller pair 307 in the first comparative example is large, and that a decrement Vi1 of the surface rotational speed Vi of the intermediate conveyance roller pair 307 in the first embodiment is smaller than the decrement Vi3 of the surface rotational speed Vi in the first comparative example. This leads to an understanding that in the first embodiment, a change in the conveyance speed Vs of the document D is reduced.

Second Comparative Example

The second comparative example will then be described with reference to FIGS. 12B, 13A to 13C, and 15B. A driving unit 700 according to the second comparative example is configured such that the drive shaft 306b of the upstream driving roller 306a of the upstream conveyance roller pair 306 is provided with an input pulley 416, in addition to the upstream pulley 403. The output pulley 402 and the input pulley 416 are connected by the driving belt 415, the upstream pulley 403 and the intermediate pulley 404 are connected by the transmission belt 407, and the intermediate pulley 411 and the downstream pulley 405 are connected by the transmission belt 408.

Figure 13A:
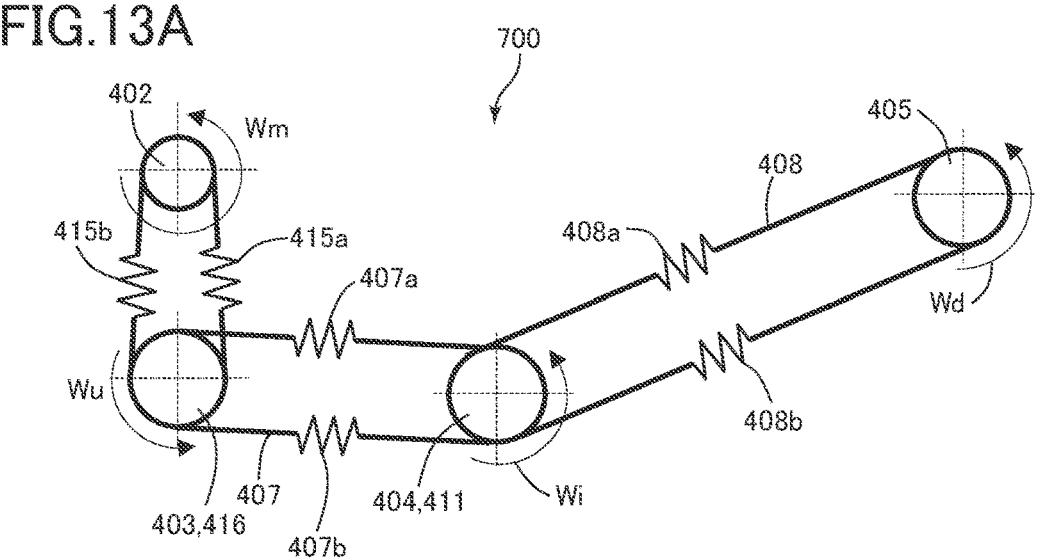
FIG. 13A is a schematic diagram of a state of the driving unit according to the second comparative example when no document is conveyed.
Figure 13B:
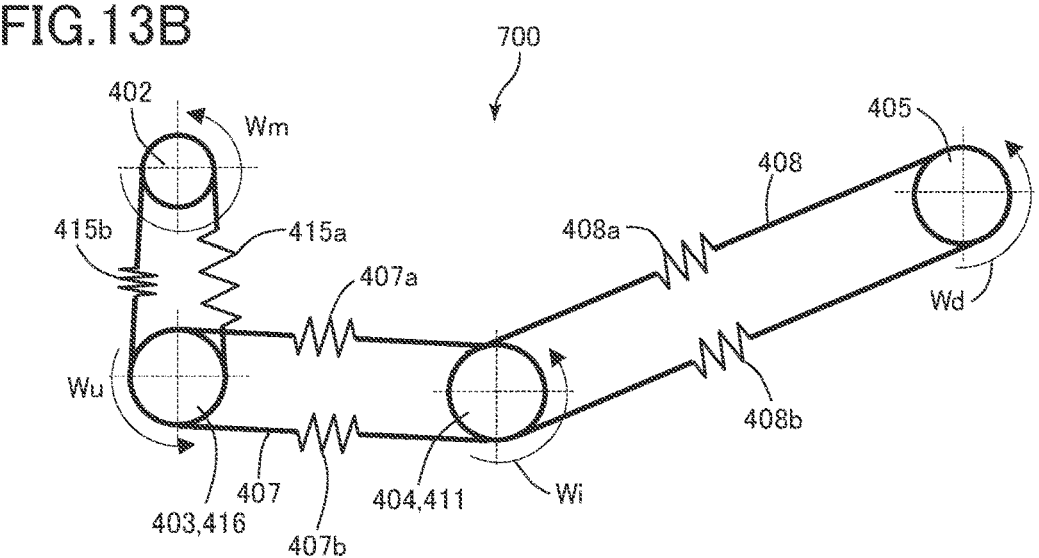
FIG. 13B is a schematic diagram of a state of the driving unit according to the second comparative example when the document is conveyed by the upstream conveyance roller pair.
Figure 13C:
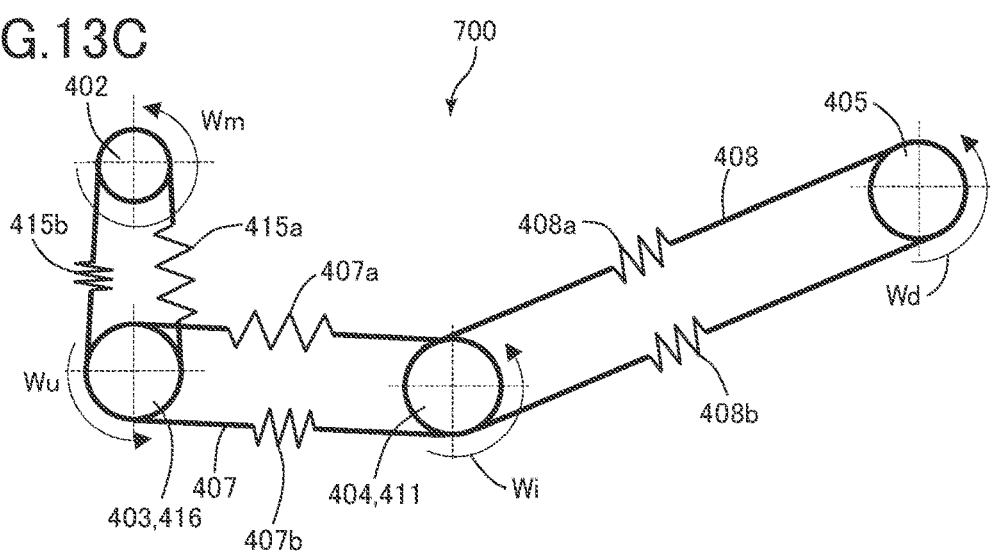
FIG. 13C is a schematic diagram of a state of the driving unit according to the second comparative example when the document is conveyed by the upstream conveyance roller pair and the intermediate conveyance roller pair.

According to the driving unit 700 configured in this manner, the driving belt 415 has a tension side 415a and a slack side 415b, as shown in FIGS. 13A to 13C. The transmission belt 407 has the tension side 407a and the slack side 407b, and the transmission belt 408 has the tension side 408a and the slack side 408b. It should be noted that FIGS.

13A to 13C are schematic diagrams of belts in which spring symbols are used to indicate degrees of extension/contraction of the belts, and that each belt actually has no spring. In the second comparative example, a relationship between the driving pulley (upstream pulley 403) and the driven pulley (intermediate pulley 404) at the transmission belt 407 is reverse to a relationship between the same in the first embodiment (see FIG. 7A), and therefore a relationship between the tension side 407a and the slack side 407b of the transmission belt 407 in the second comparative example is reverse to a relationship between the same in the first embodiment.

As shown in FIG. 13A, when no document D is conveyed (see FIG. 6A), no load is applied from the document D to rollers, and therefore the tension side and the slack side of each belt are substantially in the same state of extension/contraction. In a state in which the document D reaches the upstream conveyance roller pair 306 and the upstream conveyance roller pair 306 solely conveys the document D (see FIG. 6B), a frictional resistance caused by the document D arises at the upstream conveyance roller pair 306 only. As a result, as shown in FIG. 13B, a large load torque is applied from the upstream driving roller 306a of the upstream conveyance roller pair 306 to the upstream pulley 403, which in turn applies a tension to the tension side 415a of the driving belt 415, thus causing the tension side 415a to extend.

Thereafter, in a state in which the document D reaches the intermediate conveyance roller pair 307 and the upstream conveyance roller pair 306 and the intermediate conveyance roller pair 307 convey the document D (see FIG. 6C), the frictional resistance caused by the document D arises at both the upstream conveyance roller pair 306 and the intermediate conveyance roller pair 307. In this case, the load torque originating from the document D is distributed between the upstream conveyance roller pair 306 and the intermediate conveyance roller pair 307, and, consequently, the load torque is applied to the intermediate pulley 404 as well, which creates a tension on the tension side 407a of the transmission belt 407, thus causing the tension side 407a to extend, as shown in FIG. 13C.

Then, when the trailing edge of the document D has come out of the upstream conveyance roller pair 306 (see FIG. 6D) and the load torque applied from the document D to the upstream conveyance roller pair 306 becomes zero, the tension of the tension side 415a of the driving belt 415 shrinks. This creates a force that acts in a direction of increasing the rotational speed of the upstream conveyance roller pair 306. However, since the driving belt 415 is connected to the output pulley 402 attached to the output shaft 401a of the motor 401 that rotates at a constant speed, an increase in the rotational speed of the driving belt 415 and the input pulley 416 is suppressed. As a result, an increase in the surface rotational speed Vu of the upstream conveyance roller pair 306 is suppressed. Hence an effect of suppressing a decrease (change) in the surface rotational speed Vi of the intermediate conveyance roller pair 307 turns out to be small. Besides, because the output pulley 402 is not directly connected to the intermediate pulley 411, an effect the driving force of the motor 401 offers, the effect being suppressing a decrease in the surface rotational speed Vi of the intermediate conveyance roller pair 307, turns out to be small, too.

Figure 15B:
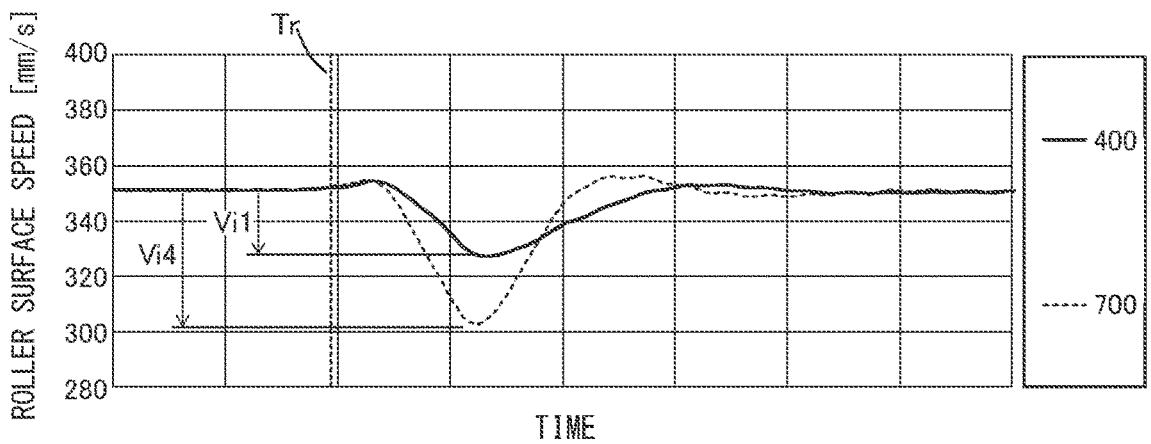
FIG. 15B depicts respective roller surface speeds of the intermediate conveyance roller pairs according to the first embodiment and the second comparative example when the trailing edge of the document comes out of the upstream conveyance roller pair.

As a result, when the frictional resistance caused by the document D is applied only to the intermediate conveyance roller pair 307 and its surface rotational speed Vi decreases as a consequence, a change in the surface rotational speed Vi is hardly reduced. FIG. 15B demonstrates that a decrement Vi4 of the surface rotational speed Vi of the intermediate conveyance roller pair 307 in the second comparative example is large, and that the decrement Vi1 of the surface rotational speed Vi of the intermediate conveyance roller pair 307 in the first embodiment is smaller than the decrement Vi4 of the surface rotational speed Vi in the second comparative example. This leads to an understanding that in the first embodiment, a change in the conveyance speed Vs of the document D is reduced.

Third Comparative Example

The third comparative example will then be described with reference to FIGS. 12C, 14A to 14C, and 15C. A driving unit 800 according to the third comparative example is configured such that the drive shaft 308b of the downstream driving roller 308a of the downstream conveyance roller pair 308 is provided with an input pulley 417, in addition to the downstream pulley 405. The output pulley 402 and the input pulley 417 are connected by the driving belt 414, the downstream pulley 405 and the intermediate pulley 411 are connected by the transmission belt 408, and the intermediate pulley 404 and the upstream pulley 403 are connected by the transmission belt 407.

Figure 14A:
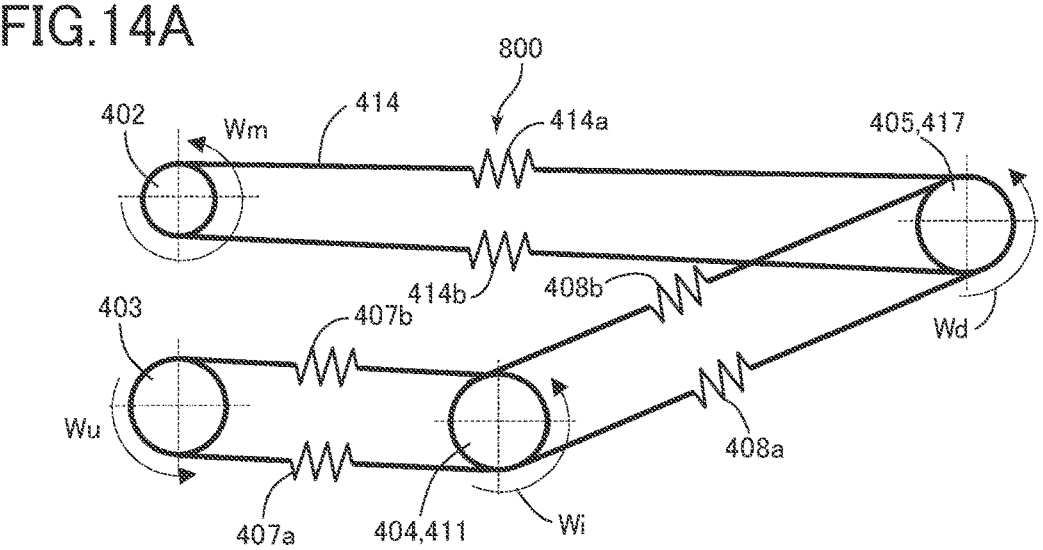
FIG. 14A is a schematic diagram of a state of the driving unit according to the third comparative example when no document is conveyed.
Figure 14B:
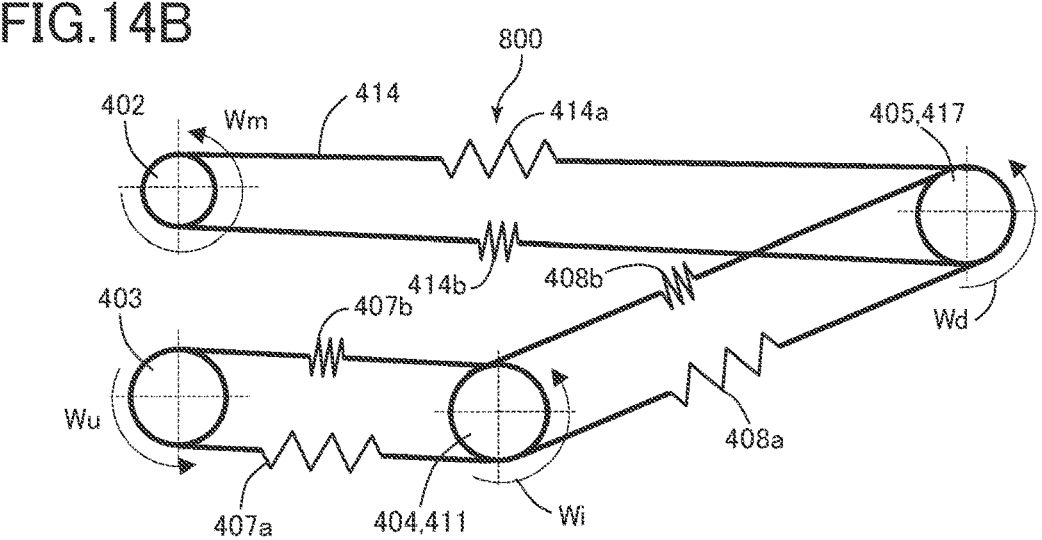
FIG. 14B is a schematic diagram of a state of the driving unit according to the third comparative example when the document is conveyed by the upstream conveyance roller pair.
Figure 14C:
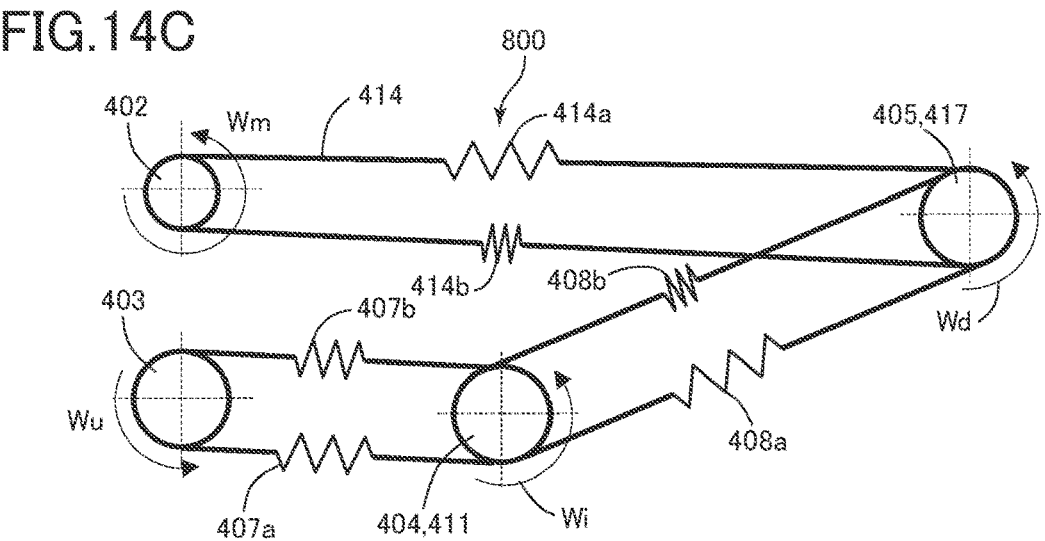
FIG. 14C is a schematic diagram of a state of the driving unit according to the third comparative example when the document is conveyed by the upstream conveyance roller pair and the intermediate conveyance roller pair.

According to the driving unit 800 configured in this manner, the driving belt 414 has a tension side 414a and a slack side 414b, as shown in FIGS. 14A to 14C. The transmission belt 408 has the tension side 408a and the slack side 408b, and the transmission belt 407 has the tension side 407a and the slack side 407b. It should be noted that FIGS. 14A to 14C are schematic diagrams of belts in which spring symbols are used to indicate degrees of extension/contraction of the belts, and that each belt actually has no spring. In the third comparative example, a relationship between the driving pulley (downstream pulley 405) and the driven pulley (intermediate pulley 411) at the transmission belt 408 is reverse to a relationship between the same in the first embodiment (see FIG. 7A), and therefore a relationship between the tension side 408a and the slack side 408b of the transmission belt 408 in the third comparative example is reverse to a relationship between the same in the first embodiment.

As shown in FIG. 14A, when no document D is conveyed (see FIG. 6A), no load is applied from the document D to rollers, and therefore the tension side and the slack side of each belt are substantially in the same state of extension/contraction. In a state in which the document D reaches the upstream conveyance roller pair 306 and the upstream conveyance roller pair 306 solely conveys the document D (see FIG. 6B), a frictional resistance caused by the document D arises at the upstream conveyance roller pair 306 only. As a result, as shown in FIG. 14B, a large load torque is applied from the upstream driving roller 306a of the upstream conveyance roller pair 306 to the upstream pulley 403, which in turn applies a tension to the tension side 407a of the transmission belt 407, thus causing the tension side 407a to extend. The tension is applied also to the tension side 408a of the transmission belt 408, thus causing the tension side 408a to extend, and also to the tension side 414a of the driving belt 414, thus causing the tension side 414a to extend.

Thereafter, in a state in which the document D reaches the intermediate conveyance roller pair 307 and the upstream conveyance roller pair 306 and the intermediate conveyance roller pair 307 convey the document D (see FIG. 6C), the frictional resistance caused by the document D arises at both the upstream conveyance roller pair 306 and the intermediate conveyance roller pair 307. In this case, the load torque originating from the document D is distributed between the upstream conveyance roller pair 306 and the intermediate conveyance roller pair 307, and, consequently, the tension of the tension side 407a of the transmission belt 407 reduces, which causes the tension side 407a to slightly contract, as shown in FIG. 14C.

Then, when the trailing edge of the document D has come out of the upstream conveyance roller pair 306 (see FIG. 6D) and the load torque applied from the document D to the upstream conveyance roller pair 306 becomes zero, the tension of the tension side 407a of the transmission belt 407 is reset. As a result, the surface rotational speed Vu of the upstream conveyance roller pair 306 increases temporarily, and a torque generated by the moment of inertia is maintained for a while. This torque is transmitted to the intermediate conveyance roller pair 307 via the slack side 407b of the transmission belt 407, exerting an effect of suppressing a decrease in the surface rotational speed Vi of the intermediate conveyance roller pair 307. However, because the intermediate conveyance roller pair 307 is driven by the motor 401 via the driving belt 414 and the transmission belt 408, when the surface rotational speed Vi of the intermediate conveyance roller pair 307 decreases, in particular, the tension side 408a of the transmission belt 408 tends to extend. For this reason, the effect the driving force of the motor 401 offers, the effect being suppressing a decrease (change) in the surface rotational speed Vi of the intermediate conveyance roller pair 307, turns out to be small.

Figure 15C:
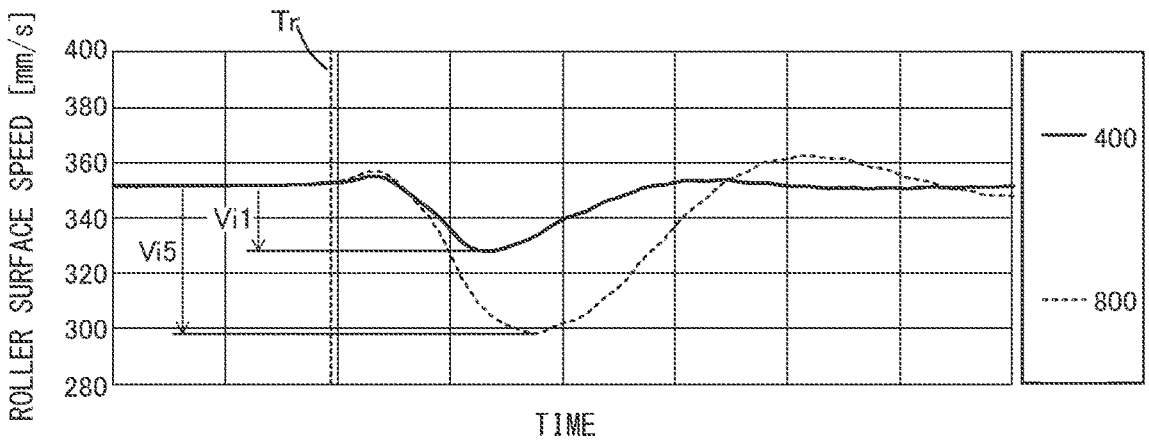
FIG. 15C depicts respective roller surface speeds of the intermediate conveyance roller pairs according to the first embodiment and the third comparative example when the trailing edge of the document comes out of the upstream conveyance roller pair.

As a result, when the frictional resistance caused by the document D is applied only to the intermediate conveyance roller pair 307 and its surface rotational speed Vi decreases as a consequence, a change in the surface rotational speed Vi is hardly reduced. FIG. 15C demonstrates that a decrement Vi5 of the surface rotational speed Vi of the intermediate conveyance roller pair 307 in the third comparative example is large, and that the decrement Vi1 of the surface rotational speed Vi of the intermediate conveyance roller pair 307 in the first embodiment is smaller than the decrement Vi5 of the surface rotational speed Vi in the third comparative example. This leads to an understanding that in the first embodiment, a change in the conveyance speed Vs of the document D is reduced.

Second Embodiment

A second embodiment, which is a partial modification of the first embodiment, will then be described with reference to FIGS. 10, 11, and 16A to 16C. In the second embodiment, the same components as described in the first embodiment will be denoted by the same reference numerals and will be omitted in further description.

Figure 10:
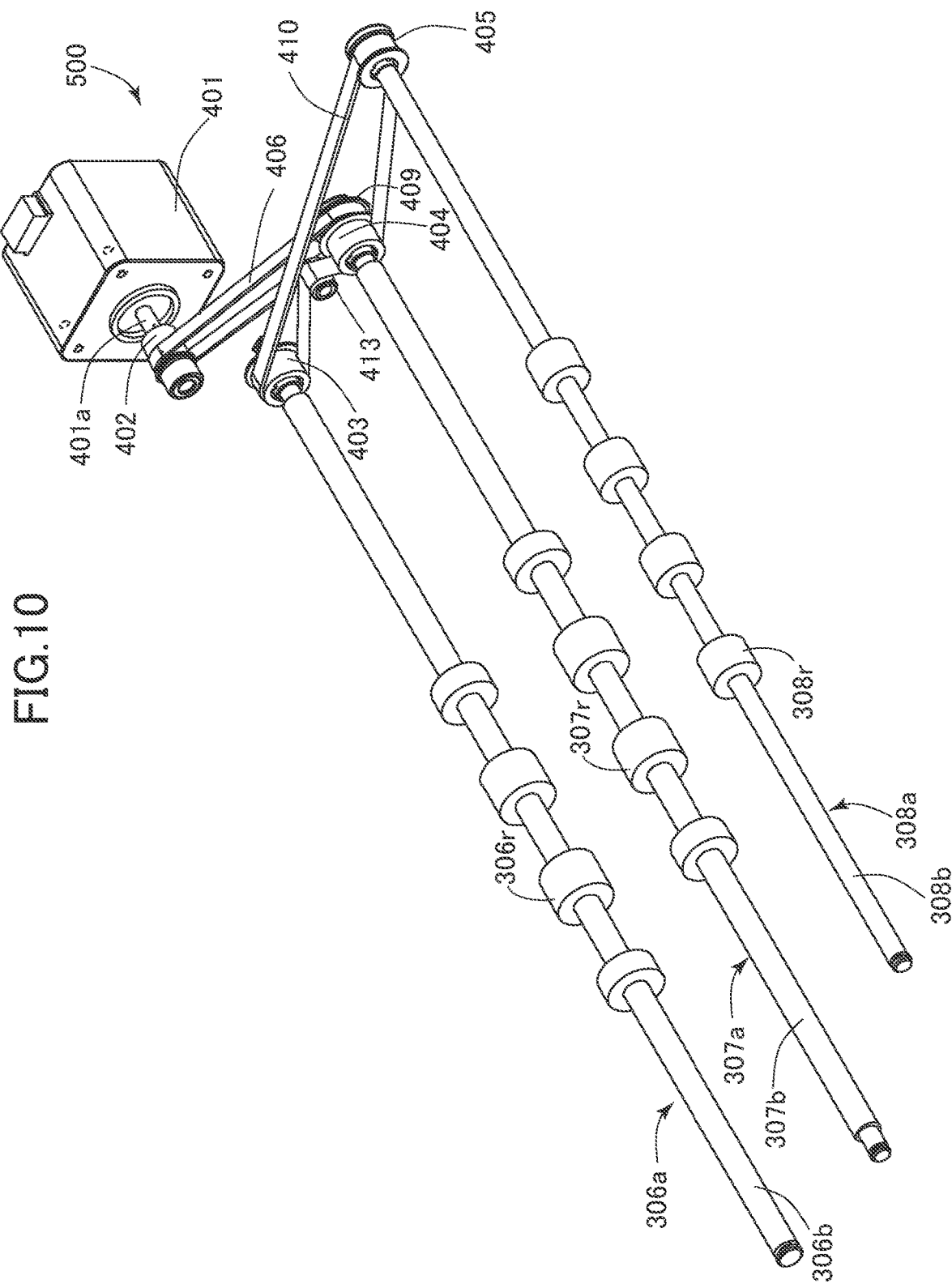
FIG. 10 is a perspective view of conveyance rollers and a driving unit according to a second embodiment.
Figure 11:
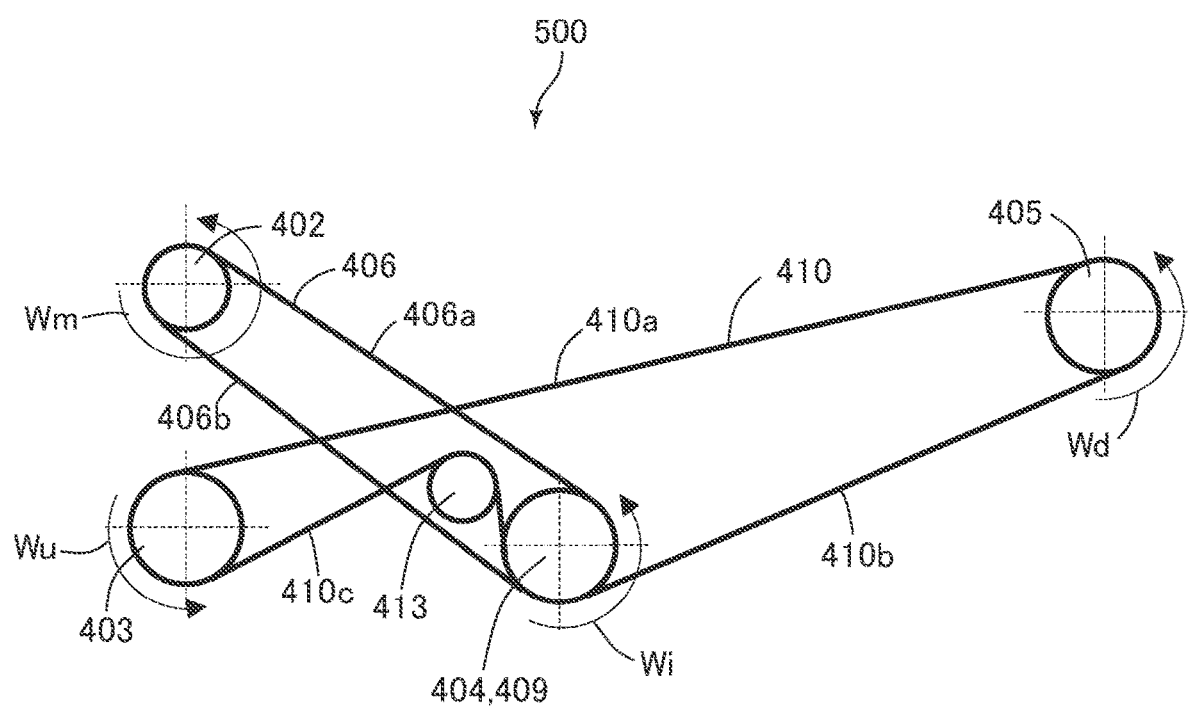
FIG. 11 is a schematic diagram of the driving unit according to the second embodiment.

A driving unit 500 according to the second embodiment is configured such that the upstream conveyance roller pair 306, the intermediate conveyance roller pair 307, and the downstream conveyance roller pair 308 are connected together by one transmission belt 410. Specifically, as shown in FIGS. 10 and 11, the driving unit 500 according to the second embodiment includes the motor 401 serving as the driving source, and the output pulley 402 fixed to the output shaft 401a of the motor 401. The driving unit 400 further includes an upstream pulley 403 serving as a first pulley, the upstream pulley 403 being fixed to the drive shaft 306b of the upstream driving roller 306a. The driving unit 500 further includes the intermediate pulley 411 serving as the second pulley, the intermediate pulley 404 being fixed to the drive shaft 307b of the intermediate driving roller 307a. The driving unit 500 further includes the downstream pulley 405 serving as the third pulley, the downstream pulley 405 being fixed to the drive shaft 308b of the downstream driving roller 308a.

The driving unit 500 further includes the input pulley 409 fixed to the upstream pulley 403. The driving unit 500 includes the driving belt 406 wound around the output pulley 402 and the input pulley 409, the transmission belt 410 wound around the upstream pulley 403, the intermediate pulley 411, and the downstream pulley 405, and the tension pulley 413 that gives the transmission belt 410 a tension. As shown in FIG. 11, in the driving unit 500 configured in this manner, the driving belt 406 has the tension side 406a and the slack side 406b, and the transmission belt 410 has a first tension side 410c, a second tension side 410a, and a slack side 410b.

When no document D is conveyed (see FIG. 6A), no load is applied from the document D to rollers, and therefore the tension side and the slack side of each belt are substantially in the same state of extension/contraction. In a state in which the document D reaches the upstream conveyance roller pair 306 and the upstream conveyance roller pair 306 solely conveys the document D (see FIG. 6B), in particular, a frictional resistance caused by the document D arises at the upstream conveyance roller pair 306 only. As a result, a large load torque is applied from the upstream driving roller 306a of the upstream conveyance roller pair 306 to the upstream pulley 403, which in turn applies a tension to the first tension side 410c of the transmission belt 410, thus causing the first tension side 410c to extend. The tension is applied also to the tension side 406a of the driving belt 406 via the transmission belt 410, the intermediate pulley 411, and the input pulley 409, thus causing the tension side 406a to extend.

Thereafter, in a state in which the document D reaches the intermediate conveyance roller pair 307 and the upstream conveyance roller pair 306 and the intermediate conveyance roller pair 307 convey the document D (see FIG. 6C), the frictional resistance caused by the document D arises at both the upstream conveyance roller pair 306 and the intermediate conveyance roller pair 307. In this case, the load torque originating from the document D is distributed between the upstream conveyance roller pair 306 and the intermediate conveyance roller pair 307, and, consequently, the tension applied to the first tension side 410c of the transmission belt 410 shrinks. Meanwhile, the load torque applied to the intermediate conveyance roller pair 307 increases, and therefore the tension applied to the tension side 406a of the driving belt 406 increases.

Then, when the trailing edge of the document D has come out of the upstream conveyance roller pair 306 (see FIG. 6D), the load torque applied from the document D to the upstream conveyance roller pair 306 becomes zero, which leaves the load torque applied from the document D to the intermediate conveyance roller pair 307 only. The load torque to the intermediate conveyance roller pair 307 thus increases, which leads to a decrease in the surface rotational speed Vi of the intermediate conveyance roller pair 307. However, since the intermediate conveyance roller pair 307 is connected to the motor 401 via the input pulley 409, the driving belt 406, and the output pulley 402, a decrease in the surface rotational speed Vi is suppressed. Particularly, because the tension side 406a of the driving belt 406 is already stretched to some extent due to the frictional resistance caused by the document D, the drop in the surface rotational speed Vi is suppressed.

A decrease in the load torque applied to the upstream conveyance roller pair 306 eliminates an extension of the tension side 410c of the transmission belt 410 in an amount corresponding to an amount of decrease in the load torque. As a result, the surface rotational speed Vu of the upstream conveyance roller pair 306 temporarily increases. After the surface rotational speed Vu of the upstream conveyance roller pair 306 increases, a torque generated by the moment of inertia is maintained for a little while. This torque is transmitted to the intermediate conveyance roller pair 307 via the second tension side 410a and the slack side 410b of the transmission belt 410, which suppresses a decrease in the surface rotational speed Vi of the intermediate conveyance roller pair 307. Hence a change in the surface rotational speed Vi of the intermediate conveyance roller pair 307 is reduced, which reduces a change in the conveyance speed Vs of the document D.

Meanwhile, the downstream conveyance roller pair 308 is kept rotated by the transmission belt 410 when the trailing edge of the document D has come out of the upstream conveyance roller pair 306. When the surface rotational speed Vi of the intermediate conveyance roller pair 307 decreases, therefore, a torque generated by the moment of inertia is transmitted from the downstream conveyance roller pair 308 in a state of rotation to the intermediate conveyance roller pair 307 via the transmission belt 410, which contributes to suppression of the decrease in the surface rotational speed Vi. This effect is combined with the effect of the increase in the surface rotational speed Vu of the upstream conveyance roller pair 306 to offer a total effect of suppressing the decrease in the surface rotational speed Vi of the intermediate conveyance roller pair 307. Hence a change in the surface rotational speed Vi of the intermediate conveyance roller pair 307 is reduced, which reduces a change in the conveyance speed Vs of the document D.

Figure 16A:
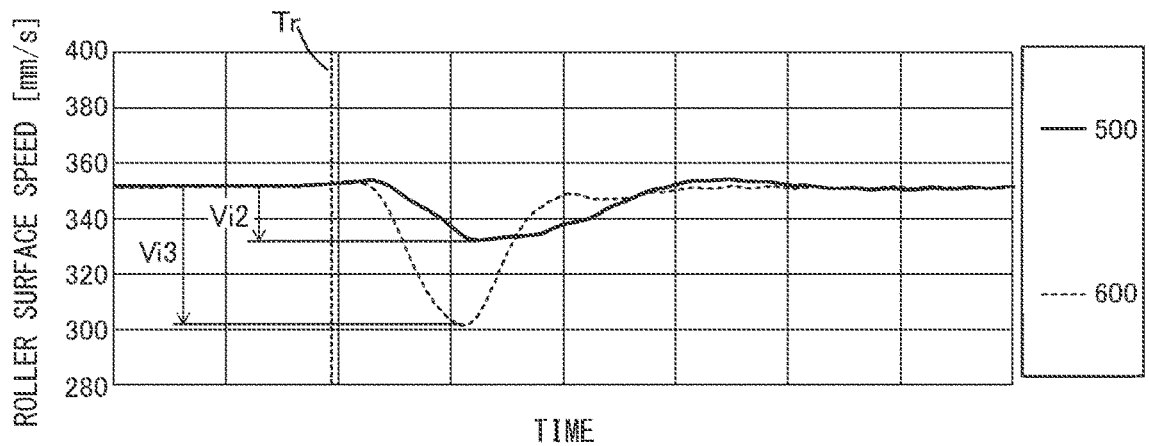
FIG. 16A depicts respective roller surface speeds of the intermediate conveyance roller pairs according to the second embodiment and the first comparative example when the trailing edge of the document comes out of the upstream conveyance roller pair.
Figure 16B:
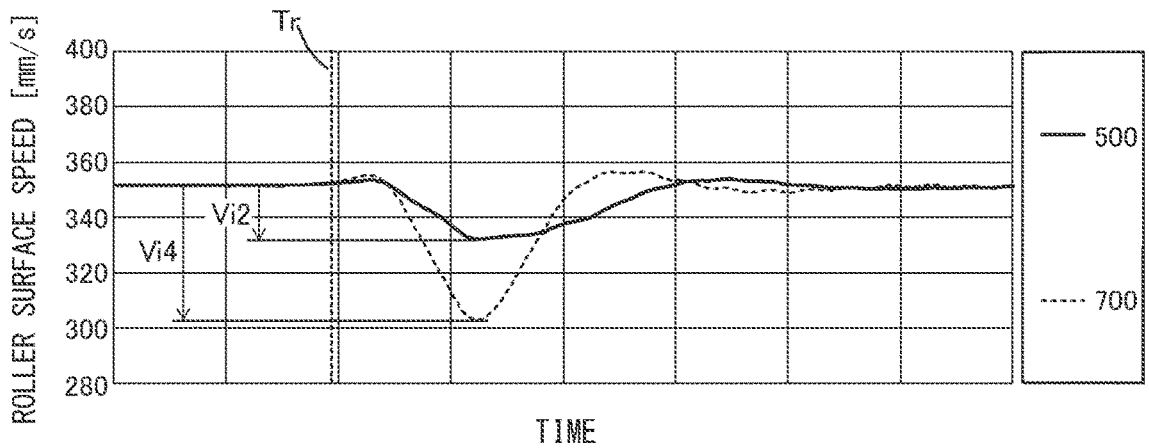
FIG. 16B depicts respective roller surface speeds of the intermediate conveyance roller pairs according to the second embodiment and the second comparative example when the trailing edge of the document comes out of the upstream conveyance roller pair.
Figure 16C:
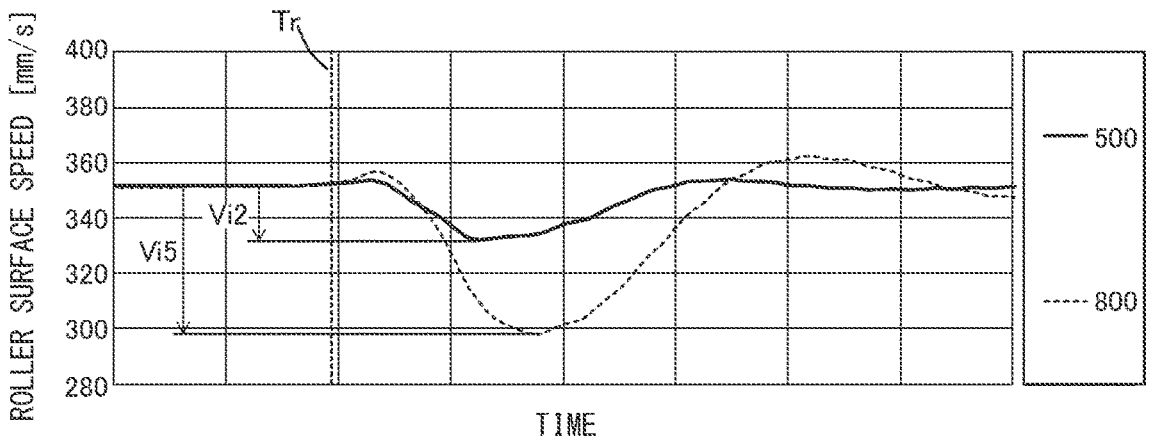
FIG. 16C depicts respective roller surface speeds of the intermediate conveyance roller pairs according to the second embodiment and the third comparative example when the trailing edge of the document comes out of the upstream conveyance roller pair.

Now a change in the surface rotational speed Vi of the intermediate conveyance roller pair 307 in the second embodiment is compared with a change in the surface rotational speed Vi of the intermediate conveyance roller pair 307 in the first to third comparative examples. FIG. 16A demonstrates that the decrement Vi3 of the surface rotational speed Vi of the intermediate conveyance roller pair 307 in the first comparative example is large, and that the decrement Vi2 of the surface rotational speed Vi of the intermediate conveyance roller pair 307 in the second embodiment is smaller than the decrement Vi3 of the surface rotational speed Vi in the first comparative example. Likewise, FIG. 16B demonstrates that the decrement Vi4 of the surface rotational speed Vi of the intermediate conveyance roller pair 307 in the second comparative example is large, and that the decrement Vi2 of the surface rotational speed Vi of the intermediate conveyance roller pair 307 in the second embodiment is smaller than the decrement Vi4 of the surface rotational speed Vi in the second comparative example. Likewise, FIG. 16C demonstrates that the decrement Vi5 of the surface rotational speed Vi of the intermediate conveyance roller pair 307 in the third comparative example is large, and that the decrement Vi2 of the surface rotational speed Vi of the intermediate conveyance roller pair 307 in the second embodiment is smaller than the decrement Vi5 of the surface rotational speed Vi in the third comparative example. This leads to an understanding that in the second embodiment, a change in the conveyance speed Vs of the document D is reduced more effectively than in the first to third comparative examples.

Except this respect, the second embodiment is identical with the first embodiment in configuration, operation, and effect, and therefore description of the configuration, operation, and effect of the second embodiment will be omitted.

POSSIBILITY OF OTHER EMBODIMENTS

In the above-described first and second embodiments, the image reading apparatus 201 includes two image reading units, i.e., the image reading unit 310 for reading an image on the front surface and the image reading unit 311 for reading an image on the back surface. The image reading apparatus 201, however, may include only one image reading unit. In this case, the first driving roller is disposed upstream to the one image reading unit and the second driving roller is disposed downstream to the same, and the first pulley and the second pulley are fixed to the first driving roller and the second driving roller, respectively. The driving source is connected to the second driving roller via the driving belt, and the first driving roller is connected to the second driving roller via the transmission belt.

In the above-described first and second embodiments, the image reading apparatus 201 includes the upstream conveyance roller pair 306, the intermediate conveyance roller pair 307, the downstream conveyance roller pair 308, and the sheet discharge roller pair 309. However, the image reading apparatus 201 may be configured not to include the downstream conveyance roller pair 308. In such a configuration, by connecting the sheet discharge roller pair 309 serving as a third driving roller to the intermediate conveyance roller pair 307 via the driving belt, a change in the conveyance speed Vs of the original D can be reduced in the same manner as in the first and second embodiments. In such a configuration, the number of components of the image reading apparatus 201 is reduced, which allows a reduction in the size of the image reading apparatus 201.

The first and second embodiments have been described above on the assumption that each pulley has the same outer diameter. However, any one of the upstream pulley, the intermediate pulley, and the downstream pulley may be reduced in size at a predetermined proportion so that speed change phases of the pulleys are shifted to each other. This allows a configuration in which changes in the surface speeds (amplitudes of surface speed waveforms) of rollers, the changes corresponding to eccentricities of the upstream pulley, the intermediate pulley, and the downstream pully, cancel out each other.

According to the present disclosure, image reading failures can be reduced without inviting an increase in cost or size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-101995, filed Jun. 18, 2021, which is hereby incorporated by reference herein in its entirety.

What is claimed is:
1. An image reading apparatus comprising:
a supporting portion configured to support a sheet;
a feeding portion configured to feed the sheet supported on the supporting portion;
a curved conveyance path in which the sheet fed by the feeding portion is conveyed;
a conveyance unit including a first driving roller configured to convey the sheet and a second driving roller configured to convey the sheet next to the first driving roller, the conveyance unit being configured to convey the sheet fed by the feeding portion in the conveyance path;

an image reading unit configured to read an image on a first surface at a location between the first driving roller and the second driving roller in a sheet conveyance direction, the first surface being an upper surface of the sheet in a state of being supported on the supporting portion;

a driving source configured to output a driving force that drives the first driving roller and the second driving roller;

an output pulley fixed to an output shaft of the driving source;

an input pulley fixed to the second driving roller;

a first pulley fixed to the first driving roller;

a second pulley fixed to the second driving roller;

a driving belt wound around the output pulley and the input pulley; and a transmission belt wound around the first pulley and the second pulley.

2. The image reading apparatus according to claim 1, wherein the transmission belt is a first transmission belt, wherein the conveyance unit further includes a third driving roller configured to convey a sheet next to the second driving roller, and wherein the image reading apparatus further comprises a third pulley fixed to the third driving roller, a fourth pulley fixed to the second driving roller, and a second transmission belt wound around the third pulley and the fourth pulley.

3. The image reading apparatus according to claim 2, wherein the image reading unit is a first image reading unit, wherein the image reading apparatus further comprises a second image reading unit configured to read an image on a second surface opposite to the first surface of the sheet conveyed by the conveyance unit, and wherein the second image reading unit is disposed between the second driving roller and the third driving roller in the sheet conveyance direction.

4. The image reading apparatus according to claim 3, further comprising:

a guide member forming the conveyance path and configured to guide a sheet conveyed by the conveyance unit, wherein a frictional resistance between the sheet and the guide member during the first image reading unit reading an image is larger than a frictional resistance between the sheet and the guide member during the second image reading unit reading an image.

5. The image reading apparatus according to claim 1, further comprising a third pulley, wherein the conveyance unit further includes a third driving roller configured to convey a sheet next to the second driving roller, wherein the third pulley is fixed to the third driving roller, and wherein the transmission belt is wound around the first pulley, the second pulley, and the third pulley.

6. An image forming apparatus comprising:

a supporting portion configured to support a sheet;

a feeding portion configured to feed the sheet supported on the supporting portion;

a curved conveyance path in which the sheet fed by the feeding portion is conveyed;

a conveyance unit including a first driving roller configured to convey the sheet and a second driving roller configured to convey the sheet next to the first driving roller, the conveyance unit being configured to convey the sheet fed by the feeding portion in the conveyance path;

an image reading unit configured to read an image on a first surface at a location between the first driving roller and the second driving roller in a sheet conveyance direction, the first surface being an upper surface of the sheet in a state of being supported on the supporting portion;

a driving source configured to output a driving force that drives the first driving roller and the second driving roller;

an output pulley fixed to an output shaft of the driving source;

an input pulley fixed to the second driving roller;

a first pulley fixed to the first driving roller;

a second pulley fixed to the second driving roller;

a driving belt wound around the output pulley and the input pulley;

a transmission belt wound around the first pulley and the second pulley; and an image forming unit configured to form the image, read by the image reading unit from the sheet, on a different sheet.

* * * * *